US006947911B1

(12) United States Patent
Moritsu et al.

(10) Patent No.: US 6,947,911 B1
(45) Date of Patent: Sep. 20, 2005

(54) METHOD FOR MAKING CONTRACT AND SYSTEM FOR PROCESSING CONTRACT

(75) Inventors: Toshiyuki Moritsu, Yokohama (JP); Harushi Someya, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 511 days.

(21) Appl. No.: 09/712,915

(22) Filed: Nov. 16, 2000

(30) Foreign Application Priority Data

Jun. 15, 2000 (JP) .............................. 2000-184561

(51) Int. Cl.⁷ .......................................... G06F 17/60
(52) U.S. Cl. ......................... 705/80; 705/37; 713/176
(58) Field of Search ................. 705/80, 37, 1; 713/176

(56) References Cited

U.S. PATENT DOCUMENTS

| | | | |
|---|---|---|---|
| 5,794,207 A * | 8/1998 | Walker et al. ................. | 705/23 |
| 6,061,792 A * | 5/2000 | Simon ......................... | 713/176 |
| 6,253,322 B1 * | 6/2001 | Susaki et al. ............... | 713/170 |
| 6,260,024 B1 * | 7/2001 | Shkedy ........................ | 705/37 |

FOREIGN PATENT DOCUMENTS

| | | |
|---|---|---|
| JP | 7-141422 | 6/1995 |
| JP | 8-149124 | 6/1996 |

OTHER PUBLICATIONS

Pfitzmann et al., "Optimal Efficiency of Optimistic Contract Signing", 1998, ACM.*

* cited by examiner

Primary Examiner—James P. Trammell
Assistant Examiner—Jalatee Worjloh
(74) Attorney, Agent, or Firm—Mattingly, Stanger, Malur & Brundidge, P.C.

(57) ABSTRACT

A contracting method and system are arranged to obtain description data in which a description content presented by one of the concerned parties with a contract to the other is built or data for specifying the description content before the concerned parties make an electronic contract for provision of a commodity or service (contract data creation signing process), generate contract data containing the description data or the specifying data (contract data creation signing process), and writing an electronic signature of both or either of the concerned parties with the contract data (contract data creation singing process and contract data signing process).

21 Claims, 26 Drawing Sheets

FIG.11

| COMMODITY ID (2130) | COMMODITY INFORMATION (4110 / 2135) |
|---|---|
| 0001 | PASSENGER AUTOMOBILE : '93 MODEL : 350,000YEN |
| 0002 | PASSENGER AUTOMOBILE : '91 MODEL : 680,000YEN |
| 0003 | HIGH-GRADE CAR : '95 MODEL : 2,240,000YEN |
| 0004 | COMMERCIAL MOTOR VEHICLE : '98 MODEL : 510,000YEN |
| ⋮ | ⋮ |

FIG.12

| COMMODITY ID (2130) | CONTRACT CONTENT (4120 / 2160) |
|---|---|
| 0001 | ------- |
| 0002 | ------- |
| 0003 | ------- |
| 0004 | ------- |
| ⋮ | ⋮ |

FIG.13

| COMMODITY ID (2130) | CONTRACT CONTENT DESCRIBING PROCESS (4130) | (3230) |
|---|---|---|
| 0001 | -------- | |
| 0002 | -------- | |
| 0003 | -------- | |
| 0004 | -------- | |
| ⋮ | ⋮ | |

FIG.14

| NEGOTIATING ID (2140) | DESCRIPTION DATA (5110) | (2150) |
|---|---|---|
| 0001 | -------- | |
| 0002 | -------- | |
| 0003 | -------- | |
| 0004 | -------- | |
| ⋮ | ⋮ | |

FIG.17

| ITEM NAME | DESCRIPTOR | PRICE |
|---|---|---|
| 26010 — TYPE OF CONTRACT | | CONTRACT FOR SALE OF USED CAR |
| 26020 — CONTRACT DATE | COVENANTER | |
| 26030 — SELLER INFORMATION (NAME, ADDRESS) | COVENANTER | |
| 26040 — SALE CAR INFORMATION (REGISTERED NUMBER, MODEL) | COVENANTER | |
| 26050 — BUYER INFORMATION (NAME, ADDRESS) | COVENANTEE | |
| 26060 — INTEREST RATE | COVENANTER | |
| 26070 — PAYMENT METHOD | | |
| 26080 — SALE PRICE | COVENANTER | |
| 26090 — PAYING AMOUNT | COVENANTEE | |
| ⋮ | ⋮ | ⋮ |

2161 — ITEM NAME column
2160 / 2162 — DESCRIPTOR column
2163 — PRICE column

FIG.18

| ITEM NAME | DESCRIPTOR | PRICE |
|---|---|---|
| SECURITY NAME | | CP |
| ISSUING DATE | CONVENANTER | |
| RETIREMENT DATE | CONVENANTER | |
| ISSUER INFORMATION (REPRESENTATIVE, COMPANY NAME, ADDRESS) | CONVENANTER | |
| ASSIGNER INFORMATION (REPRESENTATIVE, COMPANY NAME, ADDRESS) | CONVENANTEE | |
| RETIREMENT AMOUNT | CONVENANTER | |
| NOTES | CONVENANTER CONVENANTEE | |
| ⋮ | ⋮ | ⋮ |

2161 = ITEM NAME, 2160 = (table), 2162 = DESCRIPTOR, 2163 = PRICE

FIG.19

| NEGOTIATING ID | COVENANTEE ID | COMMODITY ID |
|---|---|---|

2140, 2120 = NEGOTIATING ID, 2220 = COVENANTEE ID, 2130 = COMMODITY ID

| COMMODITY ID 2130 | CONTRACT CONTENT DISPLAY TEMPLATE 4140 | 2190 |
|---|---|---|
| 0001 | ------- | |
| 0002 | ------- | |
| 0003 | ------- | |
| 0004 | ------- | |
| ⋮ | ⋮ | |

# METHOD FOR MAKING CONTRACT AND SYSTEM FOR PROCESSING CONTRACT

BACKGROUND OF THE INVENTION

The present invention relates to a method for making an electronic contract for provision of a commodity or service, and more particularly to a system for processing the contract.

As a background art, the JP-A-7-141422 has disclosed the system of writing a content of a conditional contract and data handwritten on a customer's check area and a simulation program on an IC card, passing the IC card on which the data was written to the customer, prompting a salesman to make a contract document on the content of the conditional contract in a branch office, checking if the contract document made by the salesman is consistent with the content of the conditional contract written on the IC card when the salesman calls on the customer, prompting the customer to describe the necessary items on the contract document and seal on a proper section if both are consistent with each other and the customer does not wish to change the content.

As another background art, the JP-A-8-149124 has disclosed an information delivering system of allowing an information provider to manage a communication history and a user to put delivery information on a card.

However, the invention disclosed in the JP-A-7-141422 provides a capability of preventing a deceit until the contract is sealed. On the contrary, the invention does not consider the deceit to be done after the contract is sealed, for example, the unjust rewriting of the contract or the conditional contract. If a conflict on the contract takes place between both concerned parties after the contract is sealed, it is necessary to prove the content of the contract document or the conditional contract document written when it is made originally for the purpose of determining which of the parties is just. Since the invention prepares no means of proving the correct contract after the contract is sealed, the breach of contraction of one of the parties may impair the benefit of the other party.

Further, the invention disclosed in JP-A-8-149124 provides a capability of determining if a user receives delivery information. However, the invention does not consider the rewrite of the delivery information by the user. Hence, the invention does not solve the foregoing problem as well.

Moreover, the inventions disclosed in JP-A-7-141422 and JP-A-8-149124 do not consider an unjust deed for a program for describing a content of a contract on a contract document. For example, the deceive method called the Trojan Horse enables a correct signature to be deceivingly displayed on a screen but another signature to be actually written on an electronic signature document. This kind of case may impair the benefit of the party having described the content of contract by using such an unjust program.

SUMMARY OF THE INVENTION

It is an object of the present invention to provide a method for making an electronic contract and a system for processing a contract which are arranged to lessen the damage of one concerned party caused by the breach of contract by another concerned party.

It is a further object of the present invention to provide a method for making an electronic contract and a system for processing a contract which are arranged to prevent a description program for describing a content of a contract on an electronic contract document from being unjustly operated and thereby to improve the safety of the contract.

According to an aspect of the invention, the system includes the steps of obtaining description data having a content of description presented to another party by one concerned party with a contract and data for specifying the content of description before making an electronic contract for provision of a commodity or service, creating contract data containing the description data or specifying data, and writing an electronic signature of one or both of the concerned parties with the contract data. Hence, since the contract data containing the description data or the specifying data is created, the content of description about the contract may be specified, so that the damage of one party of the contract caused by the breach of contract by the other party may be lessened.

According to the invention, the system has a function of corresponding the contract data containing the content of contract for provision of a commodity or service with the description data containing the content of description about the commodity or service transferred between the concerned parties of the contract before the contract is made by using the inherent data in the description data. In order to correspond the contract data with the description data, the content of description about the contract may be specified, so that the damage of one concerned party of the contract caused by the breach of contract by the other concerned party may be lessened. Further, since the correspondence is done by using the inherent data, an unjust deed such as interpolation of the description data may be detected.

The present invention concerns with the method for making an electronic contract for provision of a commodity or service. The method includes the steps of obtaining a description program for prompting both concerned parties of the contract to describe a content of the contract on an electronic contract document and specifying data for specifying the description program, creating the contract data containing the description program or the specifying data, and writing an electronic signature of both or either of the concerned parties with the contract data. Hence, since the contract data contains the description program or the specifying data, it is possible to prevent an unjust operation of the description program for describing the content of the contract and thereby to improve the safety of the contract.

The invention has a function of corresponding the description program for describing the content of the contract for provision of a commodity or service on an electronic contract document with the contract data obtained by describing the content of the contract on the electronic contract document by using the inherent data in the description program. Since the invention corresponds the description program with the contract data, it is possible to prevent an unjust operation of the description program for describing the content of the contract on the electronic contract document and thereby to improve the safety of the contract. According to the invention, the correspondence is done by using the inherent data, the interpolation of the description program may be detected.

BRIEF DESCRIPTION OF THE DRAWINGS

FIG. 11 is a view showing a structure of a commodity list in the first embodiment of the invention;

FIG. 12 is a view showing a structure of a contract content list in the first embodiment of the invention;

FIG. 13 is a view showing a structure of a description data storage area in the first embodiment of the invention;

FIG. 14 is a view showing a structure of a description data storage area in the first embodiment of the invention;

FIG. 17 is a view showing a structure of the content of the contract in the first embodiment of the invention;

FIG. 18 is a view showing a structure of the content of the contract (securities) in the first embodiment of the invention;

FIG. 19 is a view showing a structure of a negotiating ID in the first embodiment of the invention;

DESCRIPTION OF THE EMBODIMENTS

Figure 1:
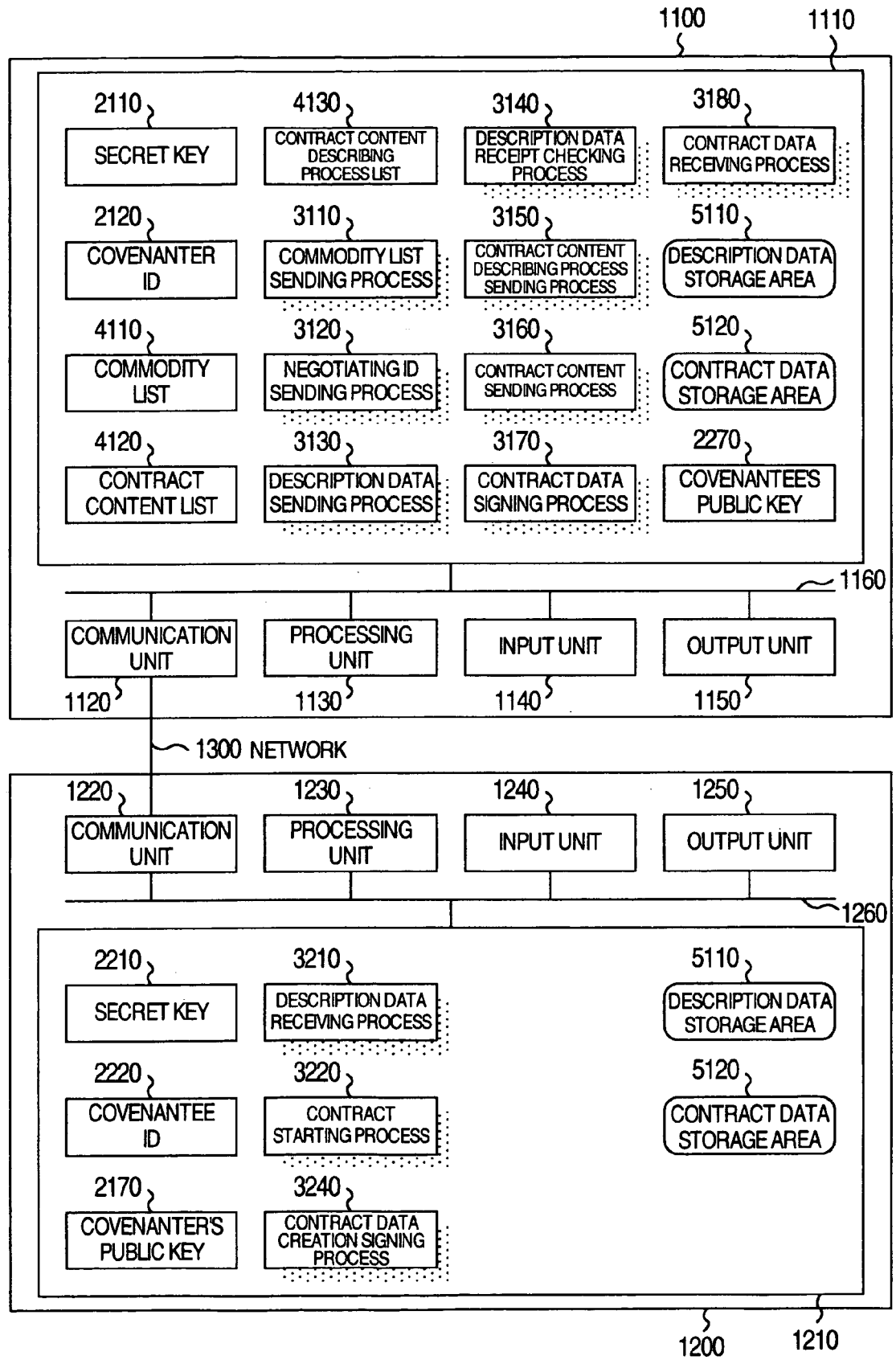
FIG. 1 is a block diagram showing a system according to a first embodiment of the invention.

Hereafter, the description will be oriented to the embodiments of the invention.

In the following embodiments of the invention, the term "contract data" means data in which a content of a contract for provision of a commodity or service is contained, that is, the data constructed by describing the content of the contract in an electronic contract document (referred to as "an electronic contract document"). Then, when both of the concerned parties with the contract agree with each other (for example, when the electronic signatures (containing digital signatures) of both of the parties are affixed to the content of the contract), it is determined that the contract is concluded.

The term "description data" means the data in which the content of description about the commodity or service to be transferred between the parties of the contract before the contract for the provision of the commodity or service reaches the conclusion. The content of description about the commodity or service includes a description about the commodity or service unilaterally presented to the covenanter by a covenantee, a question (content of request for description) or a request (content of negotiation) presented to the covenanter by the covenantee, an answer (content of answer for description) to the question or the request of the covenantee by the covenanter, a description about a commodity or service unilaterally presented to the covenanter by the covenantee, a question (content for request for description) or a request (content of negotiation) presented to the covenantee by the covenanter, an answer (content of answer for description) presented to a question or a request of the covenanter by the covenantee, and so forth.

The term "proof data" means the data in which contained is the proof that the content of description presented by one concerned party (covenanter or covenantee) is created by the other concerned party or the proof that one party agrees with the content of description presented by the other party (covenanter or covenantee). It is preferable that it is an electronic signature.

A commodity is any object to be commercially dealt. Hence, it includes an corporeal property produced for the purpose of being exchanged in the market and having a worth in itself, an incorporeal material such as electricity, heat, light and odor, an incorporeal property such as an industrial property, a copyright, an ownership of a real estate, and a pledge, a security such as a stock or a bond, a work of art, and an antique.

The term "inherent data" means a data string having an inherent length of a given original text (such as description data or contract data). If the original text is changed, therefore, the inherent data is changed accordingly. The inherent data may be the data obtained by compressing the original text at a given rate. In actual, preferably, it may be a hash value of the original text.

The term "service" means the object to be commercially dealt. For example, it includes provision of funds, transportation of persons or goods, communicating means, provision of information, cosmetics and hairdressing, health care, consultation about conflict, provision of physical or intellectual service, provision of houses or accommodations, provision of means and facilities for education, provision of amusement facilities, and provision of real estates.

The following description will be focused on the contract for the provision of a commodity for the convenience's sake. In place of the commodity, it goes without saying that the contract may concern with the provision of a service.

Hereafter, the description will be oriented to the first embodiment of the invention with reference to FIGS. 1 to 19.

The system for processing a contract that realizes the first embodiment of the invention provides a covenanter system 1100, a covenantee system 1200 and a network 1300. In this embodiment, one or more covenanters and one or more covenantees are the concerned parties who would like to make an electronic contract. The covenanter is a person who presents a contract content 2160 to be discussed below. For example, the covenanter is a person who presents a commodity (sales man, for example). The covenantee is a person who is given the contract content 2160 by the covenanter. For example, the covenantee is a person who receives a commodity (a consumer, for example). According to the contract content, however, the covenanter may be a person who receives a commodity, while the covenantee may be a person who presents a commodity. The covenanter system 1100 is a system to be used by the covenanter. The covenantee system 1200 is a system to be used by the covenantee. The network 1300 is served to transfer data between the covenanter system 1100 and the covenantee system 1200. For example, the network 1300 is the internet, an intranet, or a radio communication. Hence, the covenanter system 1200 may be a general-purpose personal computer or a mobile terminal (such as a portable phone or PHS (personal handyphone system)). In addition, the covenanter system 1100 and the covenantee system 1200 may be integrally composed without using the network 1300.

The covenanter system 1100 includes a storage unit 1110, a communication unit 1120, a processing unit 1130, an input unit 1140, an output unit 1150, and a bus 1160. The storage unit 1110 serves to store a program and a data to be processed by the covenanter system 1100. It may be a memory or a harddisk, for example. The communication unit 1120 is connected with the network 1300 so that it may relay the transfer of the data. It may be a network interface board, for example. The processing unit 1130 serves to execute the processing according to the processing program stored in the storage unit 1110. It may be a CPU. The input unit 1140 serves to read a character string, speech, a picture, and a moving picture from the outside, convert such kind of data into the corresponding digital data, and then put the digital data into the storage unit 1110. For example, the input unit 1140 may be a keyboard, a microphone attached with an analog-to-digital conversion function or a camera attached with an analog-to-digital conversion function. The output unit 1150 serves to output the data of a character string, speech, picture or moving picture into the outside as the character string, the speech, the picture and the moving picture. It may be a display or a speaker attached with a digital-to-analog conversion function. The bus 1160 serves to relay the transfer of the data among the units (the storage unit 1110, the communication unit 1120, the processing unit 1130, the input unit 1140, and the output unit 1150) connected to the bus 1160.

The covenantee system 1200 includes a storage unit 1210, a communication unit 1220, a processing unit 1230, an input unit 1240, an output unit 1250, and a bus 1260, which have the equivalent functions to the storage unit 1110, the communication unit 1120, the processing unit 1130, the input unit 1140, the output unit 1150, and the bus 1160, respectively. The storage unit 1110 serves to store a secret key 2110, a covenanter ID 2120, a public key of a covenantee 2270, a commodity list 4110, a contract content list 4120, a contract content description list 4130, a commodity list sending process 3110, a negotiating ID sending process 3120, a description data sending process 3130, a description data receipt checking process 3140, a contract content description sending process 33150, a contract content sending process 3160, a contract data signing process 3170, and a contract data receiving process 3180. The storage unit 1110 includes a description data storage area 5110 and a contract data storage area 5120. These kinds of data, process, and storage areas will be discussed below in detail. The storage unit 1210 stores a secret key 2210, a covenantee ID 2220, a public key of a covenanter 2170, a description data receiving process 3210, a contract starting process 3220, and a contract data creation signing process 3230. The storage unit 1210 includes a description data storage area 5110 and a contract data storage area 5120.

Figure 2:
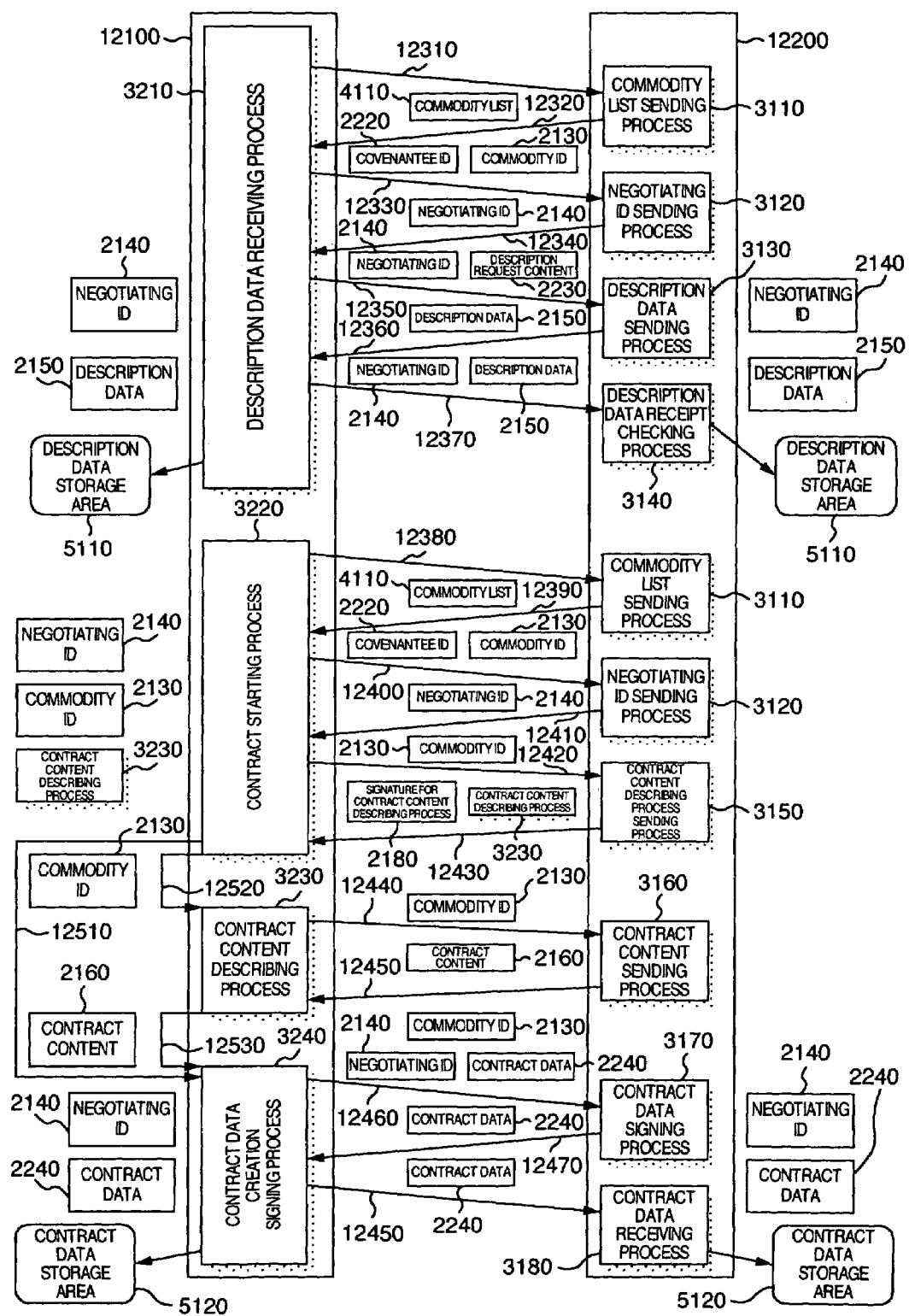
FIG. 2 is a flowchart showing transfer of messages and data between processes in the first embodiment of the invention.

The overall flow of the process will be described with reference to FIG. 2. FIG. 2 shows the flow of the data (containing messages) to be transferred between the processes to be executed by the covenanter system 1100 and the covenantee system 1200 along a time axis from the upper to the lower of the Figure.

A process 12100 included in the covenantee system includes a description data receiving process 3210, a contract starting process 3220, a contract content describing process 3230, and a contract data creation signing process 3240. The process 12100 is executed by the processing unit 1230 included in the covenantee system 1200. A process 12200 included in the covenanter system includes a commodity list sending process 3110, a negotiating ID sending process 3120, a description data sending process 3130, a description data receipt checking process 3140, a contract content describing process sending process 3150, a contract content sending process 3160, a contract data signing process 3170, and a contract data receiving process 3180. The process 12200 is executed by the processing unit 1130 included in the covenanter system 1100. In addition, the contract data creation signing process. 3240 may be executed by the processing unit 1130 included in the covenanter system 1100.

A series of processes realized by the transfer with the description data receiving process 3210, the commodity list sending process 3110, the negotiating ID sending process 3120, the description data sending process 3130, and the description data receipt checking process 3140 are the processes of storing the description content such as questions, requests, their responses or negotiating contents to be transferred between the covenanter and the covenantee (that is, between the covenanter system 1100 and the covenantee system 1200) at the previous stage of the contract as the description data 2150 to be discussed below in the storage unit 1110 of the covenanter system 1100 and the storage unit 1210 of the covenantee system 1200 and saving the data therein. If the covenantee system 1200 is requested to be small and lightweight since the covenantee system 1200 is a portable terminal, the description data 2150 may be stored in another storage unit managed by the third party without storing it in the storage unit 1210.

A series of processes realized by the transfer with the contract starting process 3220, the commodity list sending process 3110, the negotiating ID sending process 3120, and the contract content describing process sending process 3150 are the process of sending the contract content describing process 3230 of describing the data in the contract content 2160 to be described below from the covenanter system 1100 to the covenantee system 1200 and executing the process in the covenantee system 1200.

A series of processes realized by the transfer with the contract content describing process 3230 and the contract content sending process 3160 is a process of describing the contract content 2160 in an electronic contract document.

A series of processes realized by the transfer with the contract data creation signing process 3240 and the contract data signing process 3170 is a process of writing an electronic signature on the contract content 2160 to be described below, the information for specifying all or part of the description data 2150 concerning the contract content 2160, and the information for specifying the contract content describing process 3230 used for the description and storing the resulting data in the covenanter system 1100 and the covenantee system 1200.

Figure 3:
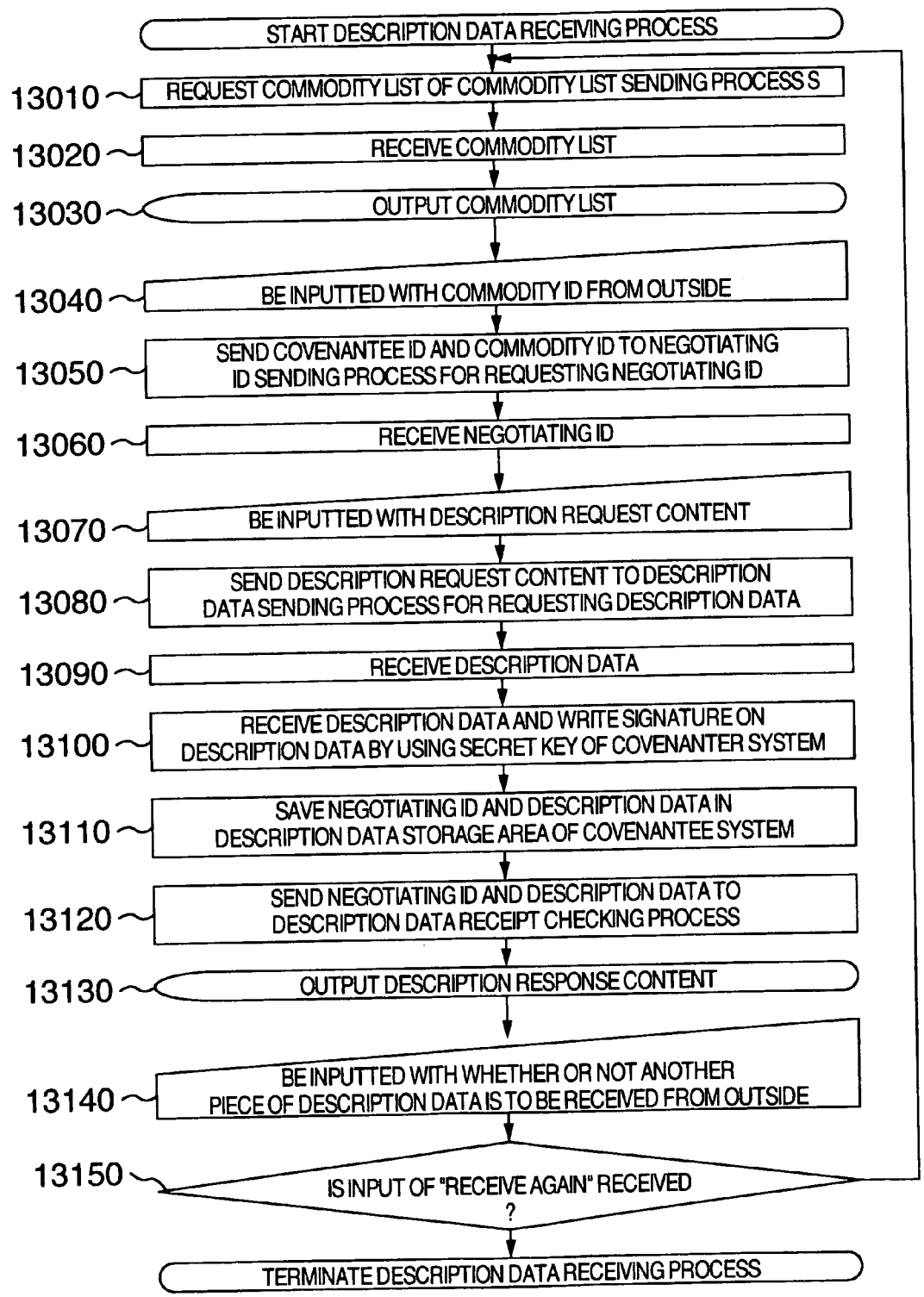
FIG. 3 is a flowchart showing a process of receiving description data in the first embodiment of the invention.

The description data receiving process 3210 will be described with reference to the flowchart of FIG. 3.

At a processing step 13010, the data for indicating the request for the commodity list 4110 is sent to the covenanter system 1100 (commodity list sending process 3110). That is, the commodity list 12310 is requested to the covenanter by the covenantee. The processing step 13010 corresponds to an arrow 12310 shown in FIG. 2. Then, at a processing step 13020, the commodity list 4110 is received from the covenanter system 1100 (commodity list sending process 3110). That is, the covenanter presents the commodity list 4110 to the covenantee. This processing step 13020 corresponds to an arrow 12320 in FIG. 2. A box described in the upper portion of each arrow in FIG. 2 indicates the data to be sent by the arrow.

As shown in FIG. 11, it is preferable that the commodity list 4110 is a table for managing the combination of the commodity ID 2130 and the commodity information 2135. The commodity ID 2130 displays a function of specifying the commodity. It is an identifier (symbol) allocated to each commodity. Each commodity has the corresponding value of the identifier. For example, it is a number, some alphabets, a combination of them, a title of a commodity, or its acronym. The commodity information 2135 is the information about the commodity. FIG. 11 shows an example of the used car sales. Hence, the commodity information 2135 is the information on the type, the model year, and the price of a car.

Then, at a processing step 13030, the commodity list 4110 is outputted by the output unit 1250 of the covenantee system 1200. At a processing step 13040, the input unit 1240 included in the covenantee system 1200 is served to accept the commodity ID 2130 as the selected information of the commodity from the covenantee. At a processing step 13050, the covenantee ID 2220 stored in the storage unit 1210 included in the covenantee system 1200 and the commodity ID 2130 accepted at the processing step 13040 are sent to the covenanter system 1100 (negotiating ID sending process 3120). That is, the operation is executed to present the commodity ID 2130 from the covenantee to the covenanter and then request the negotiating ID. The covenantee ID 2220 displays a function of specifying the covenantee. It is an identifier (symbol) allocated to each covenantee. For example, it may be a number, some alphabets, a combination of them, a title of a covenantee, or its acronym. The processing step 13050 corresponds to an arrow 12330 in FIG. 2.

At a processing step 13060, the covenanter system 1100 (negotiating ID sending process 3120) serves to send the negotiating ID 2140. That is, the operation is executed to present the negotiating ID 2140 from the covenanter to the covenantee. This processing step 13060 corresponds to an arrow 12340 in FIG. 2. As shown in FIG. 19, the negotiating ID 2140 is an identifier (symbol) determined by the combination of the covenanter ID 2120, the covenantee ID 2220 and the commodity ID 2130. For example, it may be a number, some alphabets, or a combination of them. If, however, the covenanter is limited, it is preferable that the negotiating ID 2140 is determined by the combination of the covenantee ID 2220 and the commodity ID 2130. If the commodity is limited, it is preferable that the negotiating ID 2140 is determined by the combination of the covenanter ID 2120 and the commodity ID 2130. If the commodity is limited, it is preferable that the negotiating ID 2140 is determined by the combination of the covenanter ID 2120 and the covenantee ID 2220. The covenanter ID 2120 displays the function of specifying the covenanter and is an identifier (symbol) allocated to each covenanter. For example, it may be a number, some alphabets, a combination of them, a name of a covenanter, or its acronym. The negotiating ID 2140 makes it possible to specify a commodity, a covenanter and a covenantee to be negotiated.

Figure 15:
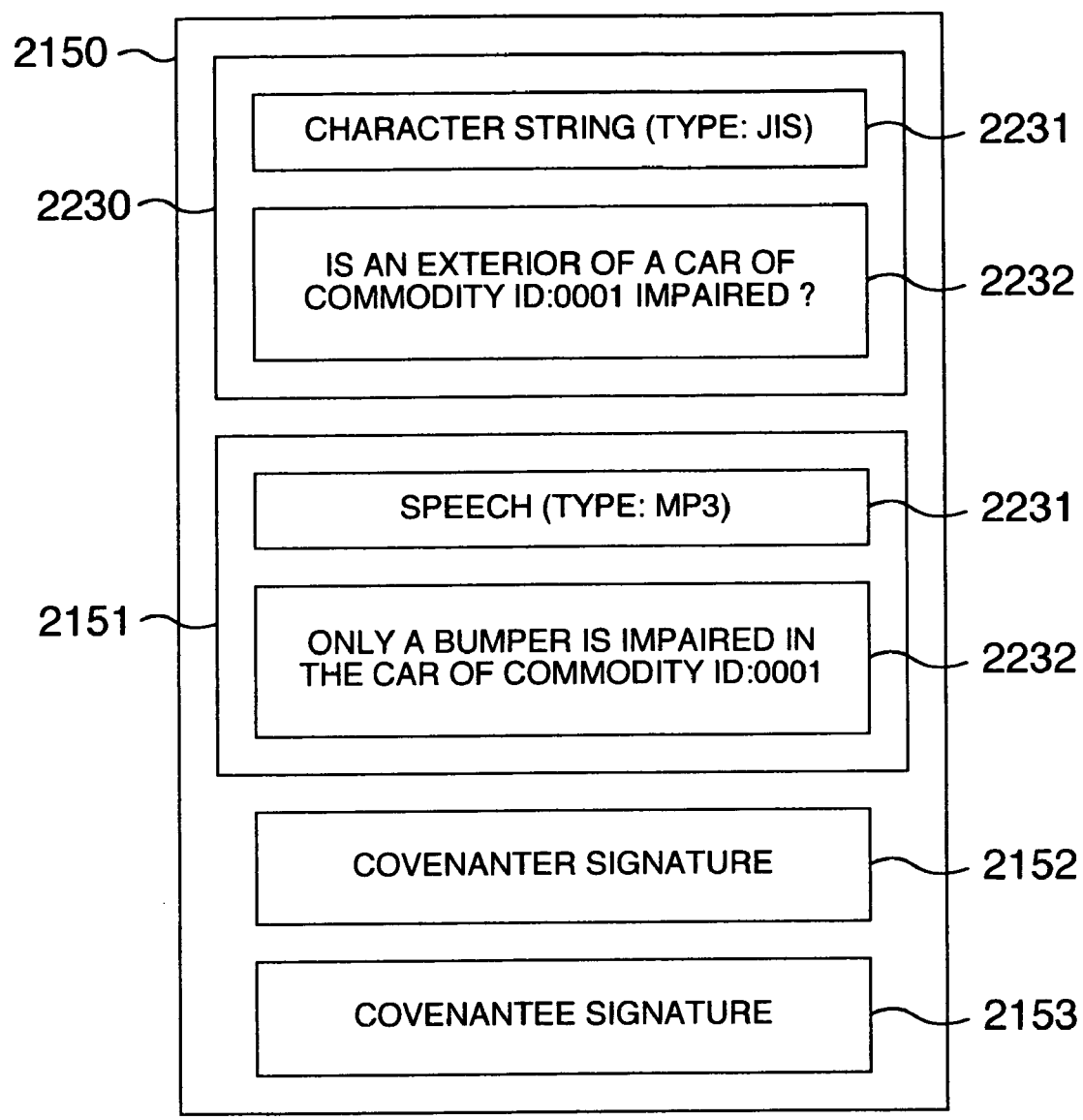
FIG. 15 is a view showing a structure of description data in the first embodiment of the invention.

At the processing step 13070, the operation is executed to receive an input of the description request content 2230 from the covenantee through the use of the input unit 1240 included in the covenantee system 1200. The description request content 2230 is integrally composed of a type 2231 and a main body 2232. The type 2231 is the data for specifying what type of the data the main body 2232 is. For example, it is the character string data, the speech data, or the moving picture data. Further, it also indicates which system is used for digitizing the data. The main body 2232 stores the concrete content of the description request as the character string data, the speech data, the moving picture data and the picture data. The description request content 2230 stores the data for specifying the input media as the type 2231 and the actual data in the main body 2232. FIG. 15 shows the example containing a question to an exterior of a car. The description request content 2230 may contain the negotiating request such as price cutting except the description request.

At a processing step 13080, the negotiating ID 2140 and the description request content 2230 are sent to the covenanter system 1100 (description data sending process 3130). That is, the operation is executed to allow the covenantee to present the negotiating ID 2140 and the description request content 2230 to the covenanter. This processing step 13080 corresponds to an arrow 12350 in FIG. 2. At a processing step 13090, the operation is executed to receive the description data 2150 from the covenanter system 1100. That is, the covenanter presents the description response content to the covenantee.

As shown in FIG. 15, the description data 2150 is composed of the description request content 2230 presented to the covenanter by the covenantee, the description response content 2151 presented to the covenantee by the covenanter, a covenanter signature 2152, and a covenantee signature 2153. The description response content 2151 is the data containing the response to the description request content 2230. The description response content 2151 is inserted into the description data 2150 by the description data sending process 3130 to be described below. The data structure of the description response content 2151 is the same as the data structure of the description request content 2230. In addition, the description data 2150 may contain the description request content 2230 and the description response content 2151 or only the description request content 2230 or only the description response content 2151. Further, the description data 2150 may contain both the covenanter signature 2152 and the covenantee signature 2153 or only the covenanter signature 2152 or only the covenantee signature 2153. In some cases, the covenanter may present the description request content 2230 to the covenantee and the covenantee presents the description response content 2151 to the covenanter. FIG. 15 shows an example containing a response to a question on the exterior of a car. The covenanter signature 2152 is given to both the description request content 2230 and the description response content 2150. The covenanter signature 2152 is inserted by the description data sending process 3130 to be described below. The covenantee signature 2153 is given to both the description request content 2230 and the description response content 2150. The covenantee signature 2153 is inserted at the following processing step 13100.

At the step 13100, a signature is written to the description request content 2230 and the description response content 2150 through the use of the secret key 2210 stored in the storage unit 1210 included in the covenantee system 1200 and then is given to the description data 2150. The method of writing a signature is executed to calculate the hashes of the description request content 2230 and the description response content 2150 and encrypt the calculated hashes with the secret key 2210. Herein, the hash means a data string having a fixed length created from a given original text. The hash is characterized in that it is quite difficult to create another message for creating the same hash value.

At a processing step 13110, the description data 2150 and the negotiating ID 2140 are stored in the description data storage area 5110 included in the storage area 1210 of the covenantee system 1200. As shown in FIG. 14, it is preferable that the description data storage area 5110 is a table for managing a combination of the negotiating ID 2140 and the storage area of the description data 2150.

At a processing step 13120, the negotiating ID 2140 and the description data 2150 are sent to the covenanter system 1100 (description data receipt checking process 3140). That is, the operation is executed to allow the covenantee to present the negotiating ID 2140 and the description data 2150 to the covenanter. This processing step 13120 corresponds to an arrow 12370 in FIG. 2.

At a processing step 13130, the description response content 2151 is outputted to the output unit 1250 included in the covenantee system 1200. Concretely, according to the type 2231 of the description response content 2151, the output unit 1250 operates to output the main body 2232 of the description response content 2151 as a character string, speech and a moving picture.

At a processing step 13140, the operation is executed to receive an input as to whether or not another kind of description data 2150 is newly received through the use of the input unit 1240 of the covenantee system 1200. At a processing step 13150, if the input indicates the data is newly received at the processing step 13140, the processing flow is passed to the processing step 13010. At a processing step 13150, if the input at the processing step 13140 indicates that the data is not received again, the description data receiving process 3210 is terminated.

In the covenantee system 1200, it is preferable to determine if the signature 2152 of the covenanter given to the description data 2150 is correct. Then, if the covenanter signature 2152 is determined to be correct in the covenantee system 1200, it is preferable that the covenantee signature 2153 is given to the description data 2150. Further, if the covenanter signature 2152 is determined to be incorrect in the covenantee system 1200 (containing the case that the covenanter signature 2152 is not given thereto), the determined result is outputted to at least one of the output unit 1150 of the covenanter system 1100 and the output unit 1250 of the covenantee system 1200. That is, it is preferable to notify at least one of the covenanter and the covenantee of the incorrectness of the covenanter signature 2152. If the covenanter signature 2152 is determined to be correct, the determined result may be outputted to at least one of the output unit 1150 of the covenanter system 1100 and the output unit 1250 of the covenantee system 1200.

In the covenanter system 1100, it is preferable that the covenantee signature 2153 attached to the description data 2150 determines if it is correct. If the covenantee signature 2153 is determined to be incorrect in the covenanter system 1100 (containing the case that the covenantee signature 2153 is not attached thereto), it is preferable that the determined result is outputted to at least one of the output unit 1150 of the covenanter system 1100 and the output unit 1250 of the covenantee system 1200. That is, it is preferable to notify at least one of the covenanter and the covenantee of the incorrectness of the covenantee signature 2153. If the covenantee signature 2153 is determined to be correct in the covenanter system 1100, the determined result may be outputted to at least one of the output unit 1150 of the covenanter system 1100 and the output unit 1250 of the covenantee system 1200.

The commodity list sending process 3110 will be described with reference to FIG. 2. The commodity list sending process is executed to receive a request for the commodity list 4110 from the covenantee system 1200 (arrow 12310 or 12380), call the commodity list 4110 stored in the storage unit 1110 of the covenanter system 1100, and then send the called commodity list 4110 to the covenantee system 1200 (arrow 12320 or 12390).

The negotiating ID sending process 3120 will be described with reference to FIG. 2. The negotiating ID sending process is executed to receive the commodity ID 2130 and the covenantee ID 2220 from the covenantee system 1200 (arrow 12330 or 12400), combine the covenantee ID 2220 and the commodity ID 2130 and the covenanter ID 2120 stored in the storage unit 1110 of the covenanter system 1100 for generating the negotiating ID 2140 shown in FIG. 19, and then send the generated negotiating ID 2140 to the covenantee system 1200 (arrow 12340 or 12410).

Figure 4:
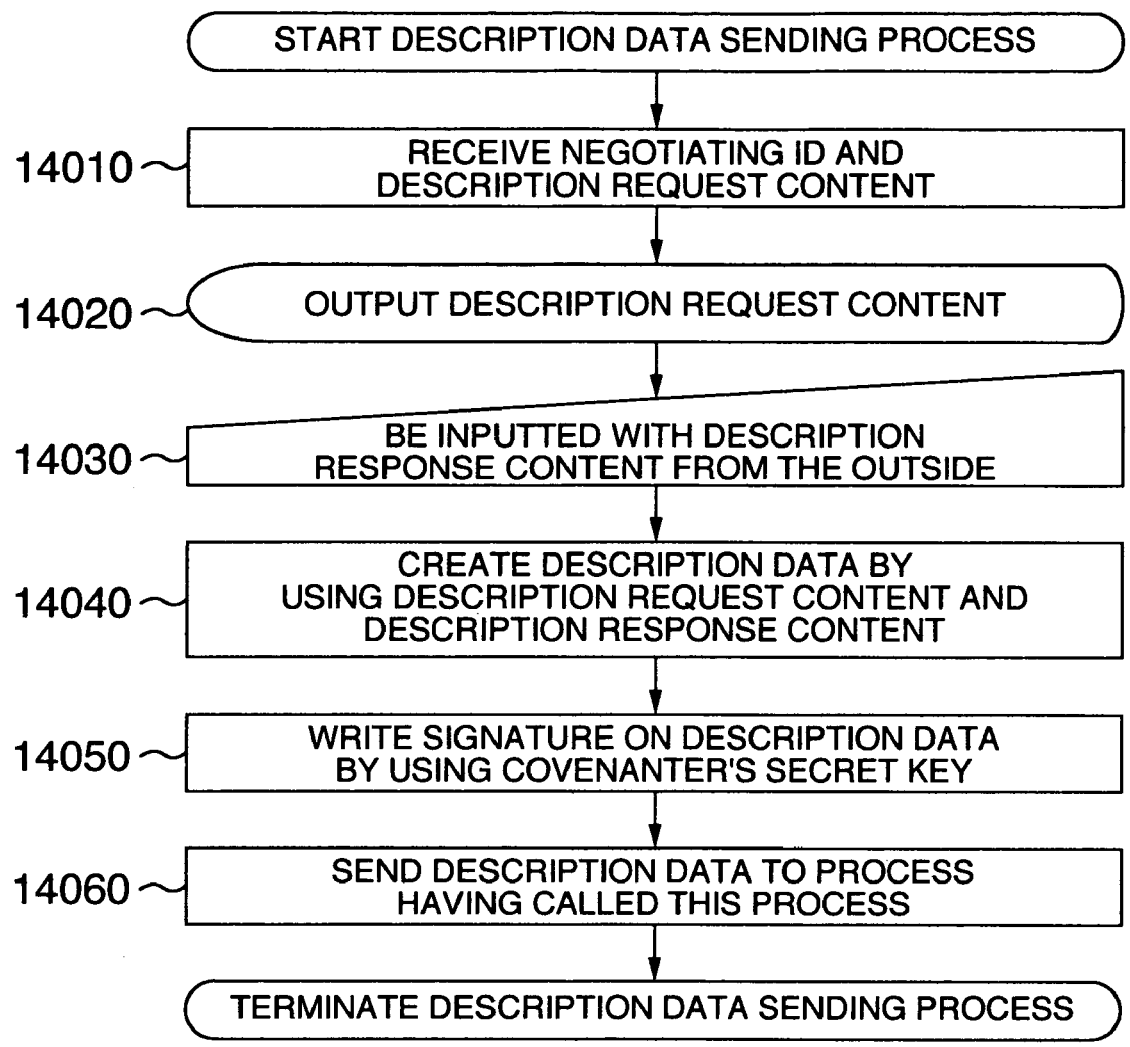
FIG. 4 is a flowchart showing a process of sending the description data in the first embodiment of the invention.

The description data sending process 3130 will be described with reference to the flowchart of FIG. 4.

At a processing step 14010, the operation is executed to receive the negotiating ID 2140 and the description request content 2230 from the covenantee system 1200. This processing step 14010 corresponds to the arrow 12350 shown in FIG. 2. At a processing step 14020, the operation is executed to output the description request content 2230 through the use of the output unit 1150 of the covenanter system 1100. The output of the description request content 2230 is the same manner as the output of the description content 2151 at the processing step 13130 of the description data receiving process 3210.

At a processing step 14030, the operation is executed to receive an input of the description response content 2151 from the covenanter through the use of the input unit 1140 of the covenanter system 1100. The description response content 2151 is inputted in a similar manner to the description request content 2230 at the processing step 13070 of the description data receiving process 3210. At the processing step 14040, the operation is executed to generate the description data 2150 (shown in FIG. 15) having the description request content 2230 and the description response content 2151 built therein.

At a processing step 14050, the operation is executed to write a signature on the description request content 2230 and the description response content 2151 through the secret key 2110 stored in the storage unit 1110 of the covenanter system 1100 and then attach it to the description data 2150. At a processing step 14060, the description data 2150 is sent to the covenantee system 1200. This processing step 14060 corresponds to the arrow 12360 in FIG. 2.

The description data receipt checking process 3140 will be described with reference to FIG. 2. The description data receipt checking process 3140 is executed to receive the negotiating ID 2140 and the description data 2150 from the covenantee system 1200 (arrow 12370), combine both of the received data as a pair, and then store the pair in the description data storage area 5110 of the storage unit 1110 included in the covenanter system 1100.

Figure 5:
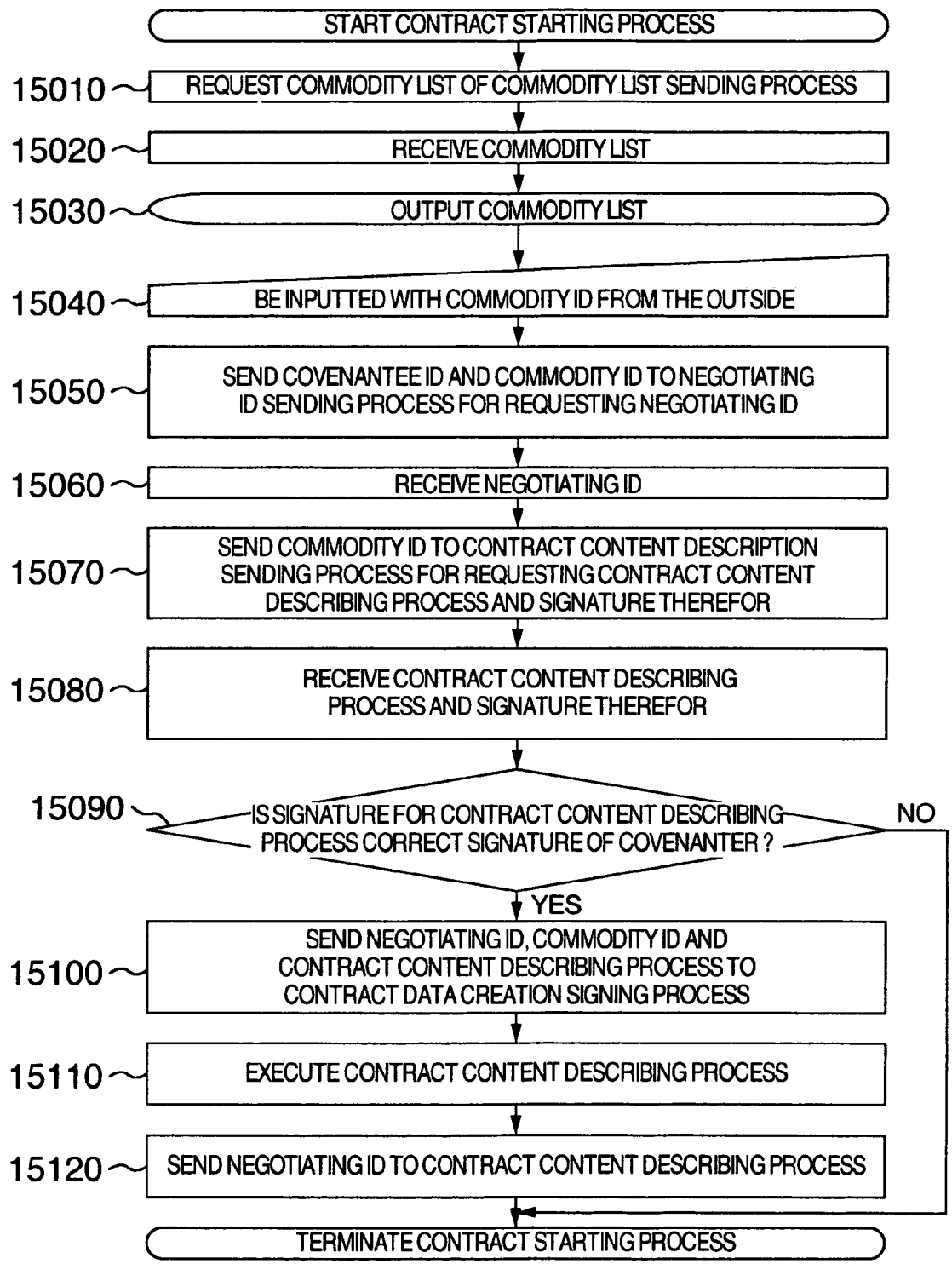
FIG. 5 is a flowchart showing a process of starting a contract in the first embodiment of the invention.

The contract staring process 3220 will be described with reference to the flowchart of FIG. 5. At a processing step 15010, the request for the commodity list 4110 is sent to the covenanter system 1100 (the commodity list sending process 3110). That is, the covenantee requests the commodity list 4110 of the covenantee. This processing step 15010 corresponds to the arrow 12380 in FIG. 2. At a processing step 15020, the commodity list 4110 is received from the covenanter system 1100 (commodity list sending process 3110). This processing step 15020 corresponds to the arrow 12390 in FIG. 5.

At a processing step 15030, the content of the commodity list 4110 is outputted by the output unit 1250 of the covenantee system 1200. At a processing step 15040, the operation is executed to receive an input of the commodity ID 2130 as the selecting information of the commodity from the covenantee. At a processing step 15050, the operation is executed to send the covenantee ID 2220 stored in the storage unit 1210 of the covenantee system 1200 and the commodity ID 2130 received at the processing step 15040 to the covenanter system 1100 (negotiating ID sending process 3120). That is, the covenantee requests the negotiating ID of the covenanter. This processing step 15050 corresponds to the arrow 12400 in FIG. 2.

At a processing step 15060, the negotiating ID 2140 is received from the covenanter system 1100 (negotiating 1D sending process 3120). This processing step 15060 corresponds to the arrow 12410 shown in FIG. 2. At a processing step 15070, the commodity ID 2130 is sent to the covenanter system 1100 (contract content describing process sending process 3150). That is, the covenantee requests the contract content describing process 3230 of the covenanter. This processing step 15070 corresponds to the arrow 12420 in FIG. 2.

At a processing step 15080, the operation is executed to receive the contract content describing process 3230 and the signature 2180 for the contract content describing process from the covenanter system 1100. This processing step 15080 corresponds to the arrow 12430 in FIG. 2. At a processing step 15090, it is verified if the signature 2190 for the contract content describing process is a correct one for the contract content describing process 3230 done by the covenanter system 1100. If it is correct, that is, the signature is the covenanter one, the operation at the processing step 15100 is executed. If it is not correct, that is, the signature 2180 is not the covenanter one, the contract starting process 3220 is terminated. The method of verifying the signature is executed to compare the hash value of the contract content describing process 3230 with the value of the signature 2190 for the contract content describing process 3230 decoded by the public key 2170 of the covenanter stored in the storage unit 1210 of the covenantee system 1200, and if the hash value is equal to the decoded value, determine that the signature is correct or if the hash value is not equal to the decoded value, determine that the signature is incorrect.

At a processing step 15100, the negotiating ID 2140 and the commodity ID 2130 are sent to the contract content describing process 3230 through the contract data creation signing process 3240. This processing step 15100 corresponds to the arrow 12510 in FIG. 2. At a processing step 15110, the contract describing process 3230 is executed by the processing unit 1230 included in the covenantee system 1200. At a processing step 15120, the negotiating ID 2140 is sent to the contract describing process 3230. This processing step 15120 corresponds to the arrow 12520 in FIG. 2.

Figure 6:
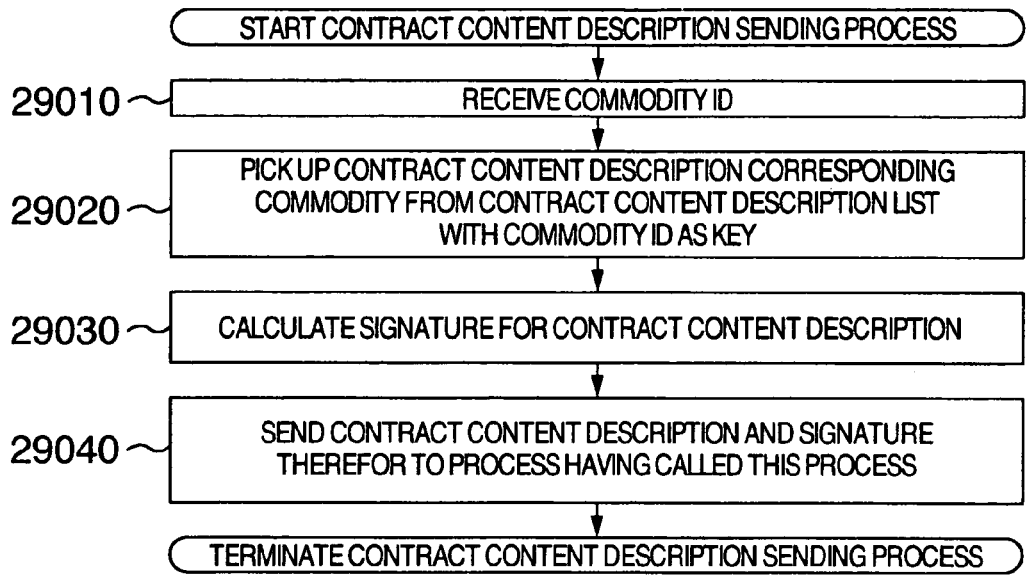
FIG. 6 is a flowchart showing a process of sending a description of the content of the contract in the first embodiment of the invention.

In turn, the description will be oriented to the contract content describing process sending process 3150 with reference to FIG. 6. At a processing step 29010, the commodity ID 2130 is received from the covenantee system 1200. This processing step 29010 corresponds to the arrow 12420 in FIG. 2. At a processing step 29020, the operation is executed to retrieve the corresponding contract content describing process 3230 to the commodity ID 29010 received at the processing step 29010 and then pick it up.

As shown in FIG. 13, it is preferable that the contract content describing process list 4130 is a table for managing a combination of the commodity ID 2130 and the contract content describing process 3230. The contract content describing process 3230 registered in the contract content describing process list 4130 is a processing program used for describing the contract content 2160 of the commodity indicated in the commodity ID 2130 paired therewith on an electronic contract document. For example, if the commodity ID 2130 indicates a used car, the contract content describing process 3230 paired with the commodity ID 2130 is a processing program used for describing the contract content 2160 about the used car on the electronic contract document. For example, if the commodity ID 2130 indicates a commercial paper (CP), the contract content describing process 3230 paired with the commodity ID 2130 is a processing program used for describing the contract content 2160 about the CP.

At a processing step 29030, the hash value of the contract content describing process 3230 is calculated by using the secret key 2110 stored in the storage unit 1110 of the covenanter system 1100. This hash value corresponds to the signature 2180 for the contract content describing process. At a processing step 29040, the contract content describing process 3230 and the signature 2180 therefor are sent to the covenanter system 1100. This processing step 29040 corresponds to the arrow 12430 in FIG. 2.

Figure 7:
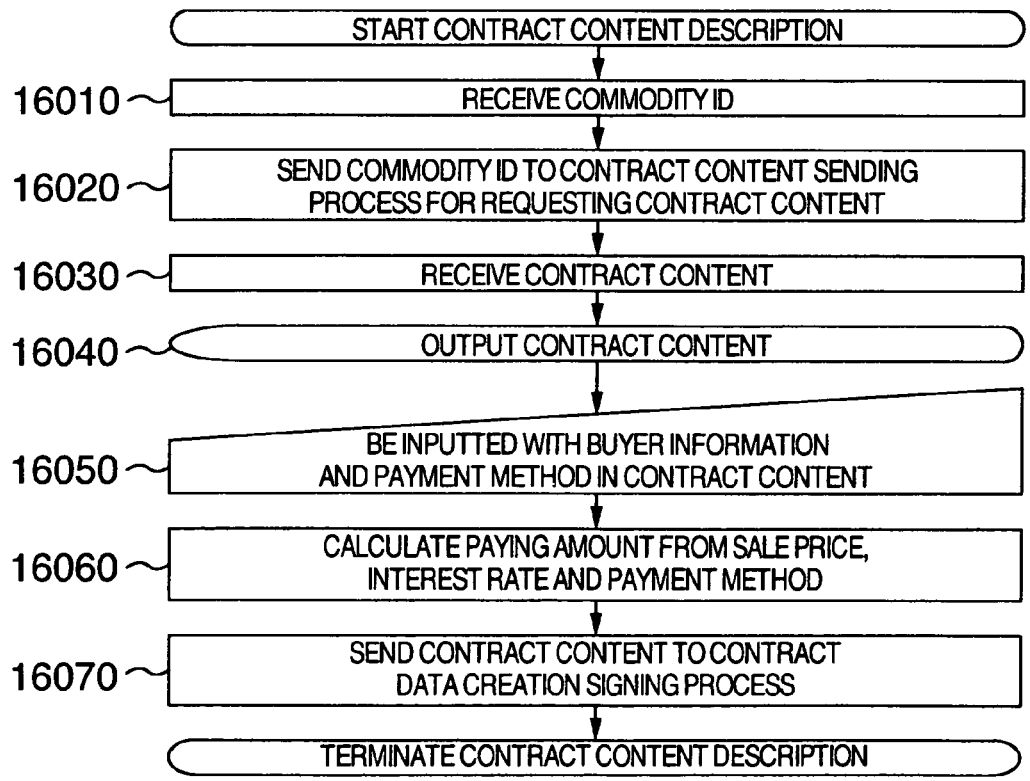
FIG. 7 is a flowchart showing a process of describing the content of the contract in the first embodiment of the invention.

The contract content describing process 3230 will be described with reference to the flowchart of FIG. 7.

At a processing step 16010, the commodity ID 2130 is received from the covenanter system 1100. In place of the commodity ID, the negotiating ID may be used. This processing step 16010 corresponds to the arrow 12520 in FIG. 2. At a processing step 16020, the commodity ID 2130 is sent to the covenanter system 1100 (contract content sending process 3160). That is, the covenantee requests the contract content 2160 of the covenanter. This processing step 16020 corresponds to the arrow 12440 in FIG. 2. At a processing step 16030, the contract content 2160 is received from the covenanter system 1100 (contract content sending process 3160).

As shown in FIG. 17, it is preferable that the contract content 2160 is a table for managing a combination of an item name 2161, a describer 2162 and a value 2163. The item name 2161 indicates the content of the information the corresponding value 2163 represents. The describer 2162 indicates a subject which describes the corresponding value 2163. The describer 2162 enters an input in the covenanter system 1100 if the value indicates the covenanter, while the describer 2162 enters an input in the covenantee system 1200 if the value indicates the covenantee. If it is blank, it means a predetermined value in which case no input is entered. FIG. 17 shows the contract content 2160 in the contract of dealing a used car. The contract content 2160 is composed of a table for managing a combination of a contract type 26010, a contract date 26020, a seller information 26030, a sale car information 26040, a buyer information 26050, an interest rate 26060, a payment method 26070, a sale price 26080, and a paying price 26090. The value 2163 given if the covenanter is given in the blank of the describer 2162 of the contract content 2160 received at the processing step 16030 has been already entered by the contract content sending process 2160 to be described below. FIG. 18 shows the contract content 2160 in the security, that is, the CP. The contract content 2160 may be used for an electronic contract as well as an electronic sale of securities merely by changing the item name 2161.

At a processing step 16050, an operation is executed to receive an input of the buyer information 26050 of the contract content 2160 and the value 2163 for the payment method 26070 from the covenantee through the use of the input unit 1240 of the covenantee system 1200. At a processing step 16060, the value 2163 of the paying price 26090 is calculated by using the sale price 26080, the interest rate 26060 and the value 2163 for the payment method 26070. The method for calculating the paying price 26090 is likewise to the conventional method for calculating the interest rate. Hence, the detailed description thereabout will be left out. At a processing step 16070, the contract content 2160 is sent to the contract data creation signing process 3240 included in the covenantee system. This processing step 16070 corresponds to the arrow 12530 in FIG. 2.

Figure 8:
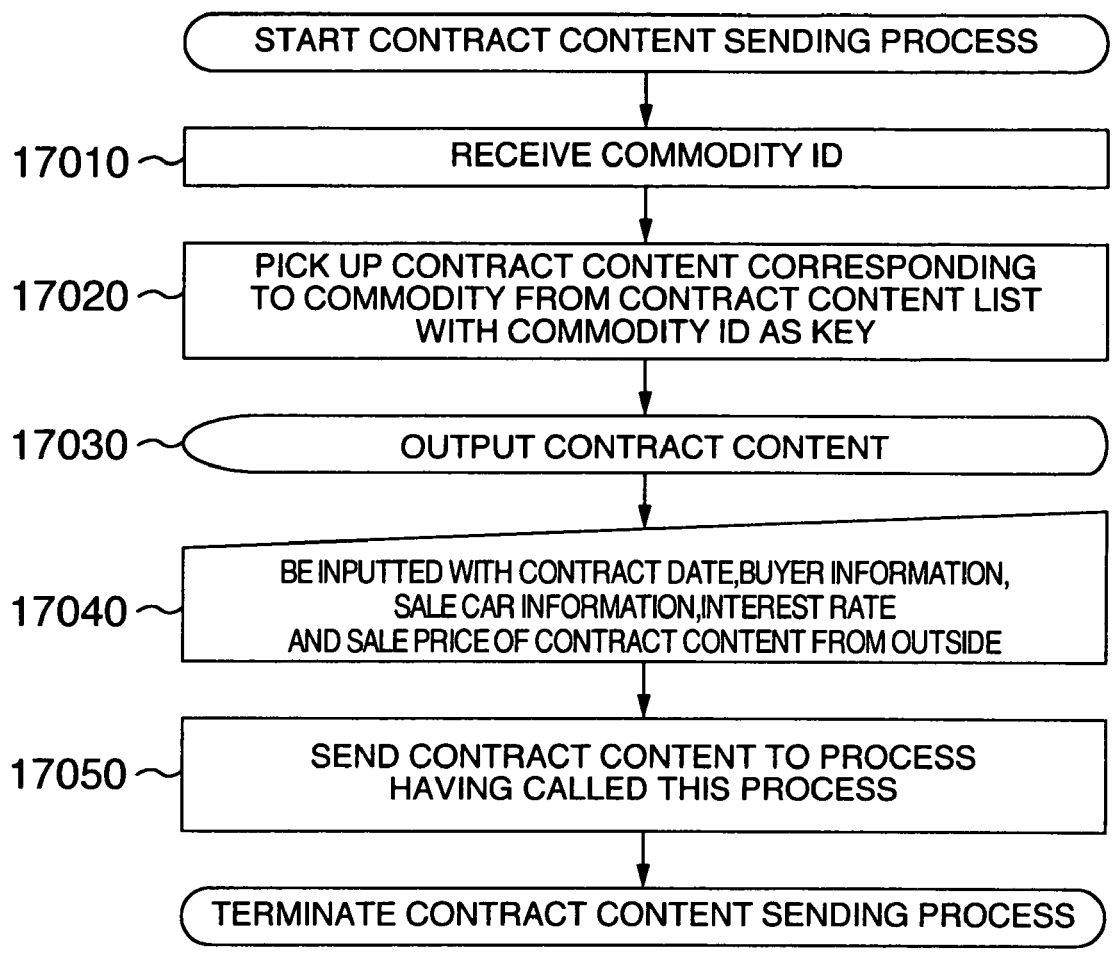
FIG. 8 is a flowchart showing a process of sending the content of the contract in the first embodiment of the invention.

The contract content sending process 3160 will be described with reference to the flowchart of FIG. 8.

At a processing step 17010, the commodity ID 2130 is received from the covenantee system 1200. In place of the commodity ID, the negotiating ID may be used. This processing step 17010 corresponds to the arrow 12440 in FIG. 2. At a processing step 17020, the operation is executed to retrieve the corresponding contract content 2160 from the contract content list 4120 stored in the storage unit 1110 of the covenanter system 1100 with the received commodity ID 2130 as a key. As shown in FIG. 12, it is preferable that the contract content list 4120 is a table for managing a combination of the commodity ID 2130 and the contract content 2160. As such, by retrieving the stored commodity ID 2130 that is equal to the received commodity ID 2130, it is possible to retrieve the corresponding contract content 2160 to the received commodity ID 2130. In place of the commodity ID, the negotiating ID may be used.

At a processing step 17030, the contract content 2160 is outputted through the use of the output unit 1150 of the covenanter system 1100. At a processing step 17040, the input unit 1140 of the covenanter system 1100 serves to receive the inputs of the contract date 26020, the seller information 26030, the sale car information 26040, the interest rate 26060, and the value 2163 of the sale price 26080 belonging to the contract content 2160 shown in FIG. 17, which are given by the covenanter. At a processing step 17050, the contract content 2160 is sent to the covenantee system 1200. This processing step 17050 corresponds to the arrow 12450 in FIG. 2.

Figure 9:
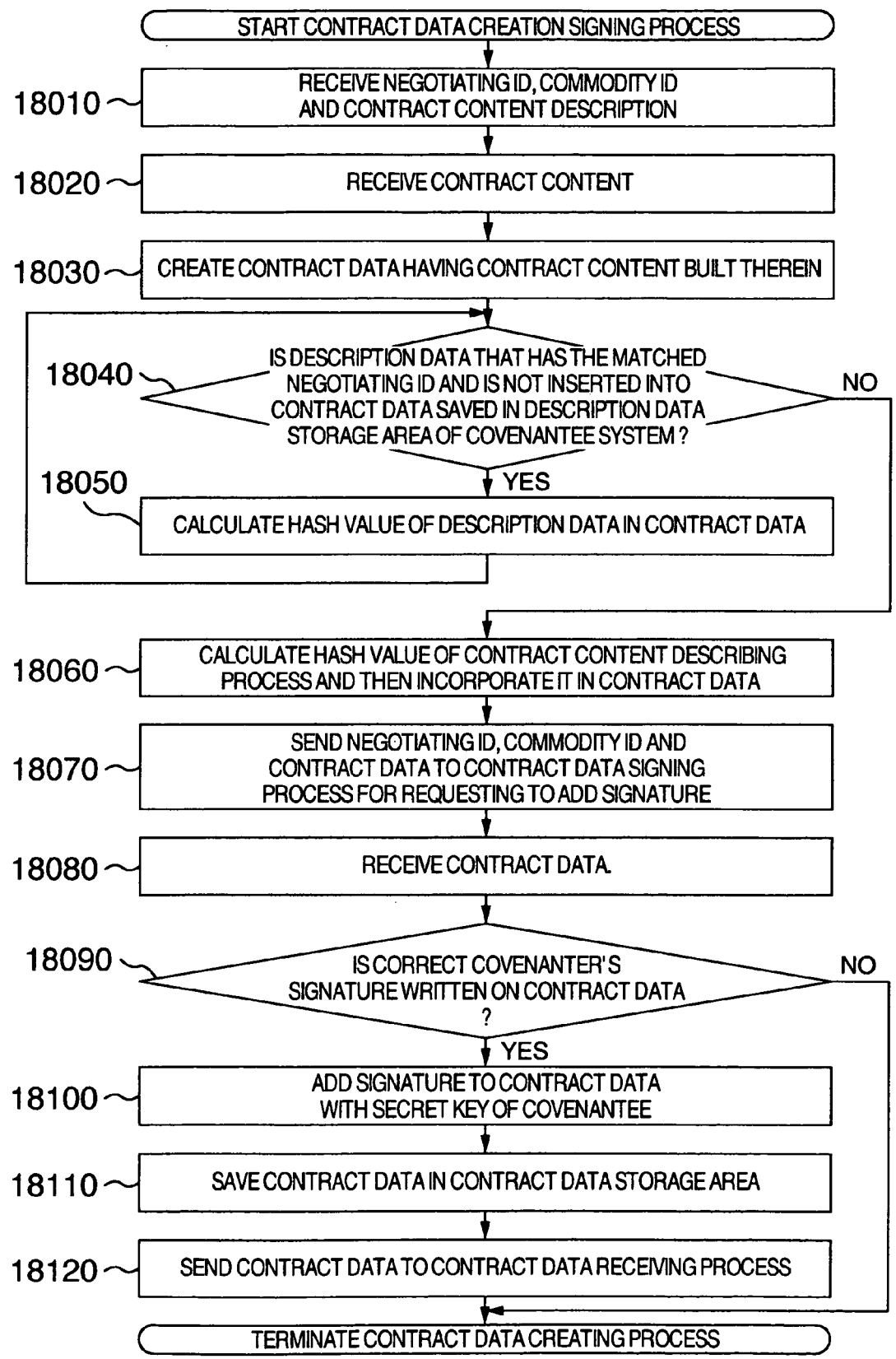
FIG. 9 is a flowchart showing a process of sending the content of the contract in the first embodiment of the invention.

The contract data creation signing process 3240 will be described with the flowchart of FIG. 9.

At a processing step 18010, the operation is executed to receive the negotiating ID 2140, the commodity ID 2130 and the contract content describing process 3230 from the covenanter system 1100. This processing step 18010 corresponds to the arrow 12510 in FIG. 2. At a processing step 18020, the contract content 2160 is received from the contract content describing process 3230. This processing step 18020 corresponds to the arrow 12530 in FIG. 2. At a processing step 18030, the operation is executed to generate the contract data 2240 having the contract content 2160 received at the processing step 18020.

Figure 16:
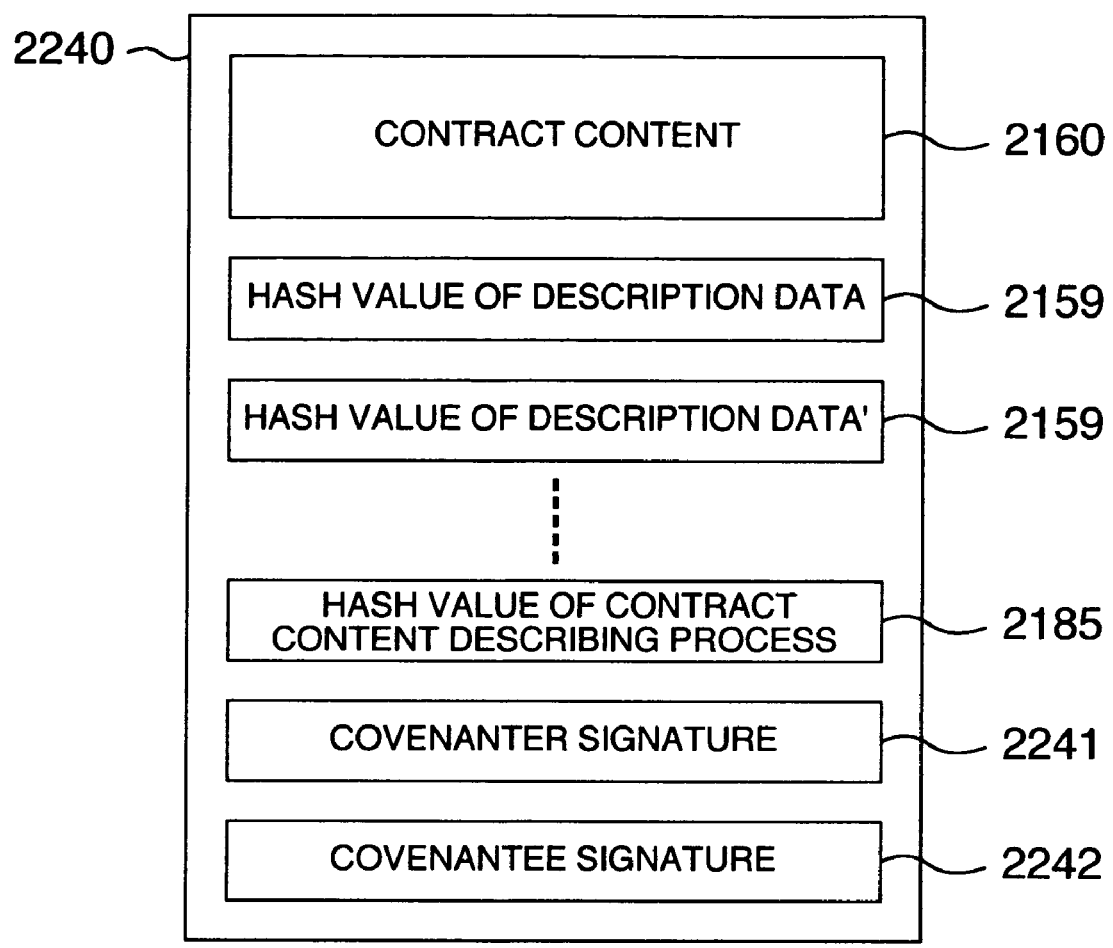
FIG. 16 is a view showing a structure of contract data in the first embodiment of the invention.

As shown in FIG. 16, it is preferable that the contract data 2240 is composed of the contract content 2160, the description data hash value 2159, the signature 2185 for the contract content describing process, the covenanter signature 2241, and the covenantee signature 2242. The hash value 2159 of the description data built in the contract data 2240 may be singular or plural or removed. The details of each data item contained in the contract data 2240 will be described when each data item is operated with reference to the flowchart of FIG. 9.

At a processing step 18040, it is determined whether or not there exists the negotiating ID 2140 matching to the negotiating ID 2140 received at the processing step 18010 and the description data 2150 excluded in the contract data 2240 is located in the description data storage area 5110 stored in the storage unit 1210 of the covenantee system 1200. As a result of the determination, if yes, the description data 2150 is retrieved. Then, the operation at a processing step 18050 is executed. If not, the operation at a processing step 18060 is executed.

At the processing step 18050, the operation is executed to calculate the hash value 2159 of the description data that corresponds to the hash of the description data 2150 retrieved at the processing step 18040 and to incorporate the hash value 2159 in the contract data 2240. With the hash value 2159 of this description data, the contract data is matched to the description data about the contract data. In place of the hash value 2159, the negotiating ID or another identifier may be used for matching the contract data to the description data. That is, the hash value 2159, the negotiating ID and another identifier are used as the specifying data for specifying the corresponding description data to the contract data. If the specifying data is contained in the contract data, the contract data and the description data may be saved differently. In particular, if two or more items of description data are given for one contract data item, the amount of information of the contract data may be effectively reduced. Further, at the processing step 18050, by building the description data 2150 itself in the contract data without building the hash value 2159 of the description data 2150, the contract data may be directly matched to the description data. Further, the specifying data may be built in the description data. The operation for matching the description data to the contract data may be executed by the processing unit 1130 of the covenanter system 1100. Upon termination of the processing step 18050, the operation at the processing step 18040 is executed again.

At a processing step 18060, the operation is executed to calculate the hash value 2185 of the contract content describing process that corresponds to the hash of the contract content describing process 3230 received at the processing step 18010 and then build the hash value 2185 into the contract data 2240. With the hash value 2185 of this contract content describing process, the contract data in which the contract content is described and the describing program used for describing the contract content on the contract document are managed as corresponding the contract data with the describing program. At the processing step 18060, without building the hash value 2185 of the contract content describing process 3230, the contract content describing process 3230 itself may be incorporated in the contract data 2240 in a manner to correspond the contract data with the describing program.

At a processing step 18070, the negotiating ID 2140, the commodity ID 2130 and the contract data 2240 are sent to the covenanter system 1100 (contract data signing process 3170). That is, the covenantee requests addition of the covenanter signature 2241 to the contract data 2240 of the covenanter. The processing step 18070 corresponds to the arrow 12460 in FIG. 2. At a processing step 18080, the contract data 2240 is received from the covenanter system 1100 (contract data signing process 3170). This processing step 18080 corresponds to the arrow 12470 in FIG. 2.

At a processing step 18090, it is determined if the covenanter signature 2241 is a correct signature given by the covenanter system 1100 and the contract content 2160 of the contract data 2240, the hash value 2159 of the description data and the hash value 2185 of the contract content describing process are not changed after they are sent at the processing step 18070. If it is determined that the signature is correct and no change is given, the operation at a processing step 18100 is executed. If it is determined that the signature is not correct and any change is given, the contract data creation signing process is terminated.

At the processing step 18100, with the secret key 2210 stored in the storage unit 1210 of the covenantee system 1200, the covenantee signature 2242 is added to the contract data. In addition, it is preferable that the covenantee signature 2242 is given to the contract content 2160 contained in the contract data 2240, the hash value 2159 of all the description data, and the hash value 2185 of the contract content describing process.

Figure 31:
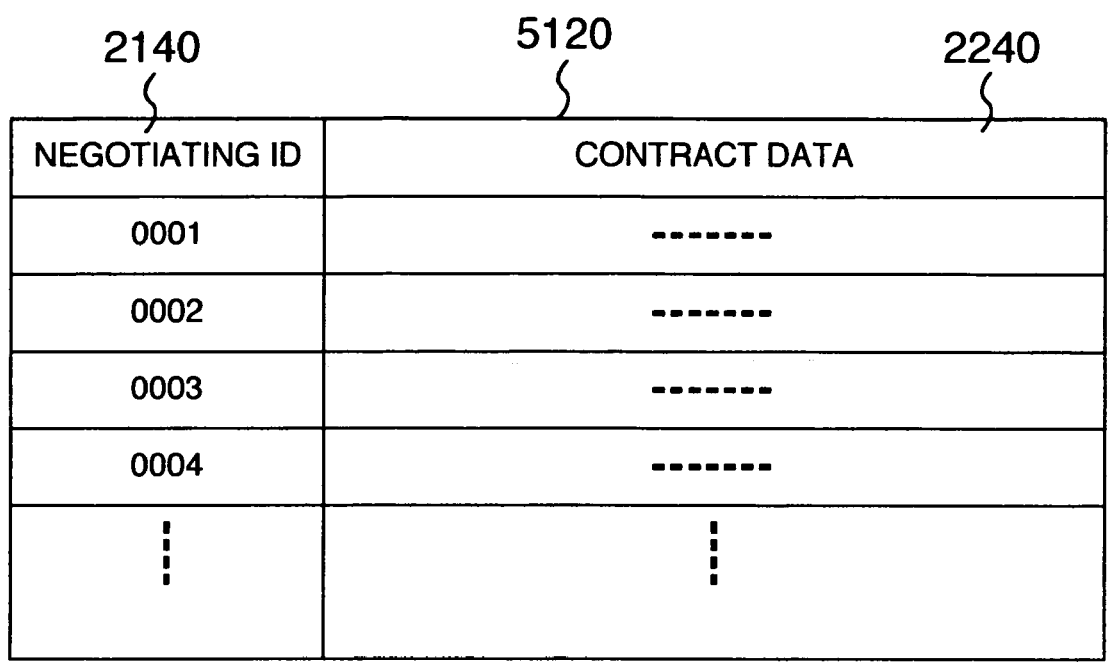
FIG. 31 is a view showing a structure of a contract data storage area in the second embodiment of the invention.

At a processing step 18110, the negotiating ID 2140 and the contract data 2240 are stored in the contract data storage area 5120 secured in the storage area 1210 of the covenantee system 1200. As shown in FIG. 31, it is preferable that the contract data storage area 5120 is a table for managing a combination of the negotiating ID 2140 and the storage area of the contract data 2240. At a processing step 18120, the contract data 2240 is sent to the covenanter system 1100 (contract data receiving process 3180). This processing step 18120 corresponds to the arrow 12480 in FIG. 2.

Figure 10:
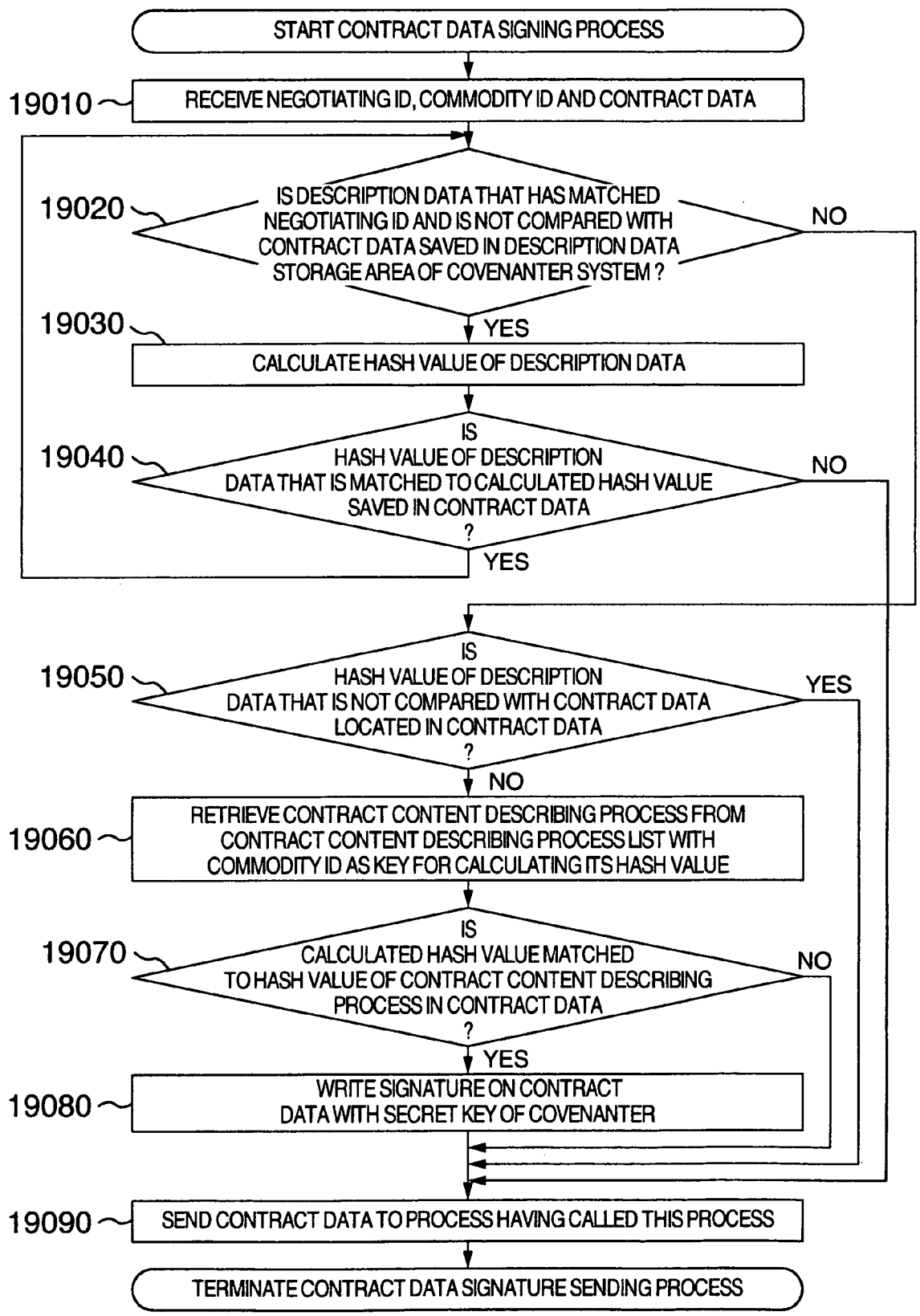
FIG. 10 is a flowchart showing a process of writing a signature on contract data in the first embodiment of the invention.

The contract data signing process 3170 will be described with reference to the flowchart of FIG. 10.

At a processing step 19010, the negotiating ID 2140, the commodity ID 2130 and the contract data 2240 are received from the covenantee system 1200. This processing step 19010 corresponds to the arrow 12460 in FIG. 2. At a processing step 19020, it is determined if there exists the description data 2150 paired with the negotiating ID 2140 matched to the negotiating ID 2140 received at the processing step 19010 in the description data storage area 5110 secured in the storage unit 1110 of the covenanter system 1100 and not being compared at a processing step 19040 to be described below. If yes, the description data 2150 is retrieved and then the operation at the processing step 19030 is executed. If not, the operation at the processing step 19050 is executed.

At a processing step 19030, the operation is executed to calculate a hash value of the description data 2150 retrieved at the processing step 19020. At a processing step 19040, it is determined if the hash value 2159 of the description data matched to the hash value calculated at the step 19030 is located in the contract data 2240. If yes, the operation at the processing step 19020 is executed. If not, the operation at a processing step 19090 is executed. In a case that not the hash value 2159 of the description data but the description data 2150 itself is incorporated in the contract data at the processing step 18050 of the contract data creation signing process 3240 shown in FIG. 9, it is determined if the description data 2150 retrieved at the processing step 19020 is located in the contract data 2240.

At a processing step 19050, it is determined if the hash value 2159 of the description data that is not compared at the step 19040 is located in the contract data 2240. If yes, the operation at a processing step 19090 is executed. If not, the operation at a processing step 19060 is executed. Also at the step 19050, like the step 19040, if the description data 2150 itself is incorporated in the contract data 2240, it is determined if the description data 2150 that is not compared is located in the contract data 2240.

At a processing step 19060, the operation is executed to retrieve the contract content describing process 3230 paired with the commodity ID 2130 from the contract content describing process list 4130 stored in the storage unit 1110 of the covenanter system 1100 with the commodity ID 2130 received at the step 19010 as a key and then calculate a hash value of the process 3230. In place of the commodity ID, the negotiating ID may be used. At a processing step 19070, the hash value calculated at the step 19060 is compared with the hash value 2185 of the contract content describing process in the contract data 2240. If matched, the operation at a processing step 19080 is executed. At the step 18070 of the contract data creation signing process shown in FIG. 9, if not the hash value of the contract content describing process but the contract content describing process 3230 is directly incorporated, the contract content describing process 3230 retrieved at the step 19060 is compared with the contract content describing process 3230 in the contract data 2240.

At a processing step 19080, with the secret key 2110 stored in the storage unit 1110 of the covenanter system 1100, the covenanter signature 2241 is added to the contract data. The covenanter signature 2241 should be added to the contract content 2160 contained in the contract data 2240, the hash value 2159 of all the description data and the hash value 2185 of the contract content describing process. At a processing step 19090, the contract data is sent to the covenantee system 1200. This processing step 19090 corresponds to the arrow 12470 in FIG. 2.

The contract data receiving process 3180 will be described with reference to FIG. 2. The contract data receiving process 3180 is executed to store the negotiating ID 2140 and the contract data 2240 in the contract data storage area 5120 secured in the storage unit 1110 of the covenanter system 1100 when the contract data 2240 is received from the covenantee system 1200 (arrow 12480). Alternatively, the contract data receiving process 3180 is executed to the negotiating ID 2140 and the contract data 2240 on the storage medium to be supplied to the covenantee when the contract data 2240 is received from the covenantee system 1200 (arrow 12480).

Figures 28, 29:
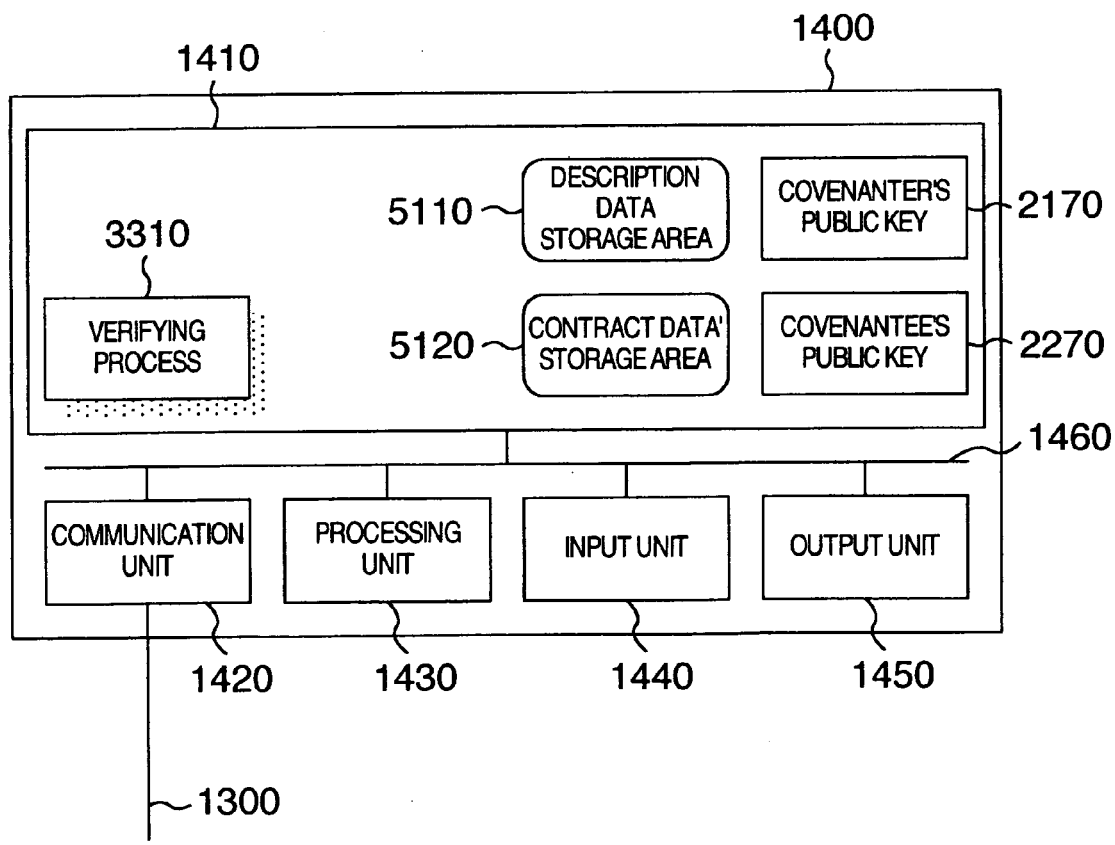
FIG. 28 is a view showing a structure of a contract content display template list in the second embodiment of the invention.
FIG. 29 is a view showing a system arrangement in a verifying system in the second embodiment of the invention.

The description will be oriented to the verifying system 1400 and the verifying process 3310 to be executed therein with reference to FIG. 29. The verifying system 1400 is a processing unit that operates to verify if the contract data 2240 is interpolated and output the content if not interpolated. Herein, the verifying system 1400 and the verifying process 3310 should be installed neutrally by a third party (for example, the court of law) to the covenanter and the covenantee. At first, the system arrangement of the verifying system 1400 will be described.

The verifying system 1400 includes a storage unit 1410, a communication unit 1420, a processing unit 1430, an input unit 1440, and an output unit 1450, all of which are connected through a bus 1460. The storage unit 1410, the communication unit 1420, the processing unit 1430, the input unit 1440, the output unit 1450 and the bus 1460 provide the same capabilities as the storage unit 1110, the communication unit 1120, the processing unit 1130, the input unit 1140, the output unit 1150 and the bus 1160 of the covenanter system 1100, respectively. The processing unit 1420 is connected with a network 1300 so that the processing unit 1420 may transfer the data with the covenanter system 1100 or the covenantee system 1200. The storage unit 1410 stores the covenanter's public key 2170, the covenantee's public key 2270 and the verifying process 3310 and has a description data storage area 5110 and a contract data storage area 5120.

Figure 30:
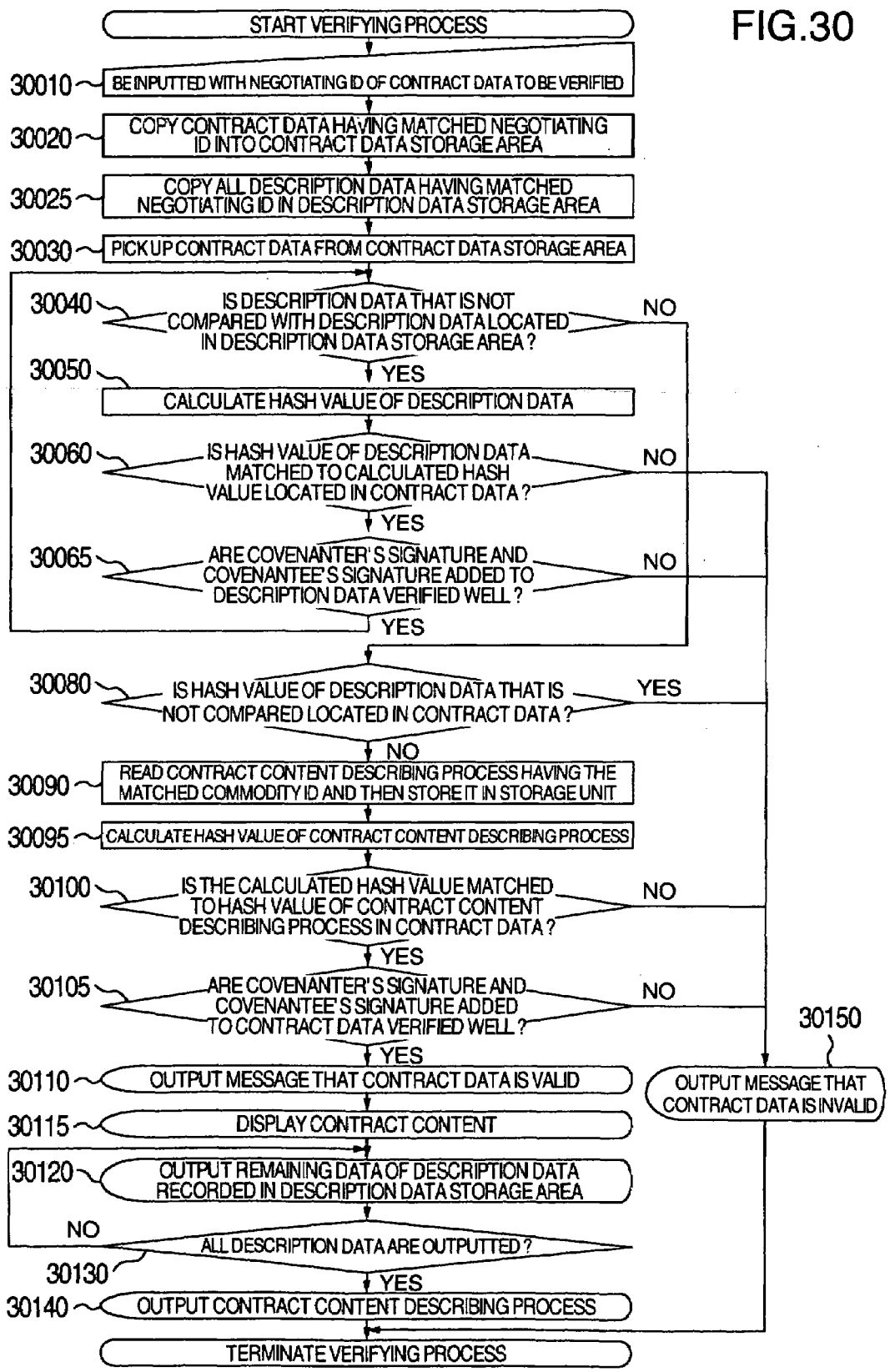
FIG. 30 is a flowchart showing a verifying process in the second embodiment of the invention.

The verifying process 3310 will be described with reference to FIG. 30. At a processing step 30010, the negotiating ID 2140 of the contract data 2240 to be verified is received from the outside. If the term "negotiating ID 2140" appears in the following description, it indicates the negotiating ID 2140 received at this step 30010.

At a processing step 30020, the operation is executed to request the contract data 2240 having the matched negotiating ID 2140 of the covenanter system 1100 and then store it in the contract data storage area 5120 of the verifying system 1400. In receipt of the request from the verifying system 1400, the covenanter system 1100 operates to retrieve the contract data 2240 having the same combination of values as the requested negotiating ID 2140 from the contract data storage area 5120 of the covenanter system 1100 and then send it back to the verifying system 1400. If the term "contract data storage area 5120" solely appears in the following description, it indicates the contract data storage area 5120 of the verifying system 1400. At this step, the verifying system 1400 may request the contract data 2240 of not the covenanter system 1100 but the covenantee system 1200.

At a processing step 30025, the operation is executed to request all the description data 2150 having the matched negotiating ID 2140 of the covenanter system 100 and then store the description data 2150 in the description data storage area 5110 of the verifying system 1400. In receipt of the request from the verifying system 1400, the covenanter system 1100 operates to retrieve all the description data 2130 having the same combination of values as the requested negotiating ID 2140 from the description data storage area 5110 of the covenanter system 100 and then send the description data 2130 back to the verifying system 1400. If the term "description data storage area 5110", solely appears in the following description, it indicates the contract data storage area 5110 of the verifying system 1400. At this step, the verifying system 1400 may request the description data 2150 of not the covenanter system 100 but the covenantee system 1200.

At a processing step 30030, the contract data 2240 is picked out of the contract data storage area 5110. If the term "contract data 2240" solely appears in the following description, it indicates the contract data 2240 picked out at this step.

At a processing step 30040, the loop composed of a processing step 3005 to be described below operates to determine if the unprocessed description data 2150 is left. If yes, the description data 2150 is selected and then the processing arrow is shifted to a processing step 30050. If not, the processing arrow is shifted to a processing step 30080.

At the step 30050, the operation is executed to calculate the hash value of the description data 2150 selected at the previous step. At a processing step 30060, it is determined if the hash value 2159 of the description data matched to the hash value calculated at the previous step is contained in the contract data 2240. If yes, the processing arrow is shifted to a processing step 30065. If not, the processing arrow is shifted to a processing step 30150.

At a processing step 30065, it is verified if the covenanter signature 2152 and the covenantee signature 2153 in the description data 2150 selected at the step 30040 are both correct through the use of the covenanter's public key 2170 and the covanantee's public key 3370. If both are correct, the processing arrow is shifted to the step 30040. If not, the processing arrow is shifted to the step 30150.

At a processing step 30080, the loop composed of the processing step 3065 operates to determine if the hash value 2159 of the description data that is not compared is located in the contract data 2240. If yes, the processing arrow is shifted to the processing step 30150. If not, the processing arrow is shifted to the processing step 30090.

At the step 30090, the operation is executed to request the contract content describing process 3230 having the matched commodity ID 2130 in the negotiating ID 2140 of the covenanter system 1100 and then store it in the storage unit 1420. Further, in receipt of the request from the verifying system 1400, the covenanter system 1100 operates to retrieve the contract content describing process 3230 having the same combination of values as the requested commodity ID 2130 from the contract content describing process list 4130 and then send it back to the covenanter system 1100. If the term "contract content describing process 3230", solely appears in the following description, it indicates the contract content describing process 3230 stored in the storage unit 1420.

At a processing step 30095, the operation is executed to calculate a hash value of the contract content describing process 3230. At a processing step 30100, it is determined if the hash value calculated at the previous step is matched to the hash value 2185 of the contract content describing process in the contract data. If matched, the processing arrow is shifted to the processing step 30105. If not matched, the processing arrow is shifted to the step 30150.

At the step 30105, the operation is executed to verify if the covenanter signature 2241 and the covenantee signature 2242 added to the contract data 2240 are both correct through the use of the public key 2170 of the covenanter and the public key 2270 of the covenantee. If both are correct, the processing arrow is shifted to a processing step 30110. If not, the processing arrow is shifted to the step 30150.

At the step 30110, the message that the contract data 2240 is valid is outputted. The output is, for example, a character string indicating that "the contract data is effective". At a processing step 30115, the contract content 2160 in the contract data 2240 is outputted.

At a processing step 30120, the loop composed of a processing step 30130 operates to retrieve the unprocessed description data 2150 from the description data storage area 5110 and then output the description content 2151 of the description data 2150. Like the output of the description content 2151, the description content 2151 is outputted so that the main body 2232 is outputted as a character string, a picture, speech and a moving picture according to the type 2231 at the step 13130 of the description data receiving process 3210. At the step 30130, it is determined if the output of all the description data 2150 stored in the description data storage area 5110 is terminated. If terminated, the processing arrow is shifted to a processing step 30140. If not, the arrow is shifted to the step 30120.

At the step 30140, the contract content describing process 3230 is outputted and the verifying process 3310 is terminated. The output of the contract content describing process 3230 is a program list of the contract content describing process 3230, for example. At a processing step 30150, a message that the contract data 2240 is invalid is outputted and then the verifying process 3310 is terminated. The output is a character string that "the contract data is invalid", for example.

The signatures of both or either of the concerned parties added to the description data may be made to correspond with the signatures of both or either of the parties added to the contract data when managing the data. This makes it possible to verify the person who presents the description content. For example, the signature of the covenanter added to the description data is compared with the signature of the covenanter added to the contract data. If both has a given correspondence, it proves that the covenanter creates or agrees with the description content.

It is possible to execute the transfer of the description content between the covenantee system 1200 and the covenanter system 1100 and allow the covenanter system 1100 to conclude the contract. In this case, the covenantee system 1200 executes the description data receiving process 3210, while the covenanter system 1100 executes the commodity list sending process 3110, the negotiating ID sending process 3120, the description data sending process 3130, the description data receipt checking process 3140, the contract content description process sending process 3150, the contract content sending process 3220, the contract content describing process 3230, and the contract data creation signing process 3240. For example, when the covenanter and the covenantee allow their systems (covenanter system 1100 and covenantee system 1200) to transfer the description content through the network 1300 and make a contract, the covenantee comes to the covenanter's shop in which he or she uses the covenanter system 1100 for concluding the contract. The person who enters the contract content to the covenanter system 1100 may be only the covenanter but also both of the covenanter and the covenantee. Further, the description data saved in the covenantee system 1200 may be taken in the covenanter system 1100 when the contract is made.

Hereafter, the first embodiment of the invention will be summarized. At the preliminary stage of the contract, the description content such as a question or a request about a target commodity, its response, and the negotiating content to be transferred between the covenanter system 1100 and the covenantee system 1200 is saved as the description data 2150 in the covenanter system 1100 and the covenantee system 1200. At the stage of the contract, all or part of the description data 2150 about the contract content 2160 is made to correspond with the contract data 2240. Further, the contract content describing process 3230 for describing the contract content is made to correspond with the contract data 2240. Further, the covenanter system 1100 and the covenantee system 1200 operate to write the signatures on the description data 2150 matched to the contract data 2240 and the contract content describing process 3230 and then save the contract data 2240 in both systems.

A program, which enables both or either of the covenanter system 1100 (processing unit 1130) and the covenantee system 1200 (processing unit 1230) to execute both or either of the process 12100 to be done by the covenantee system 1200 and the process 12200 to be done by the covenanter system 1100, is stored in a storage medium (for example, a floppy disk, a harddisk, a memory card, a memory stick, a magneto-optical disk, a CD-ROM, a CD-R/RW, a DVD-ROM, a DVD-RAM, and a server) and then is supplied to both or either of the covenanter and the covenantee. Alternatively, the recording medium in which the program for enabling the covenantee system 1200 (processing unit 1230) to execute the process 12100 to be done by the covenantee system 1200 may be supplied from the covenanter to the covenantee.

Further, a program, which enables both or either of the covenanter system 1200 (processing unit 1130) and the covenantee system 1200 (processing unit 1230) to execute both or either of the process 12100 to be done by the covenantee system 1200 and the process 12200 to be done by the covenanter system 1100, may be supplied to both or either of the covenanter and the covenantee through the network. In this case, it is preferable to take the steps of reading the program stored in the recording medium and sending the read program onto the network through the use of the program sending unit. A program, which enables the covenanter system 1200 (processing unit 1230) to execute the process 12100 to be done by the covenantee system 1200, may be supplied from the covenanter to the covenantee through the network.

According to the first embodiment of the invention, since the description content is matched to the contract content by using the inherent data in the description data, it is possible to specify the description content at the first stage of the contract and reduce the damage to one party by the other party's breach of contract if a conflict on the contract takes place between both of the concerned parties. Hence, in a case that the contract for provision of a commodity or service is calculated through the network, it is effective to improve the safety on the contract in the electronic commerce. This may reduce the damage to the covenanter by the breach of the contract of the covenantee or the damage to the covenantee by the breach of contract of the covenanter. In particular, it is effective in the case that the description content is not reflected on the contract content.

Moreover, according to the first embodiment of the invention, by adding the signatures of both or either of the concerned parties to the description content, it is possible to prevent the description content from being interpolated by both or either of the concerned parties or the third party, which is effective in improving the safety on the contract.

Moreover, according to the first embodiment of the invention, both of the concerned parties manage the description content and the contract content as matching the former to the latter, respectively, or the just third party matches the description content to the contract content. This is effective in improving the credibility as a physical evidence of the description content.

Moreover, according to the first embodiment of the invention, for matching the contract content to the describing program through the use of the inherent data in the describing program (for example, the describing program itself or the hash value of the describing program), it is possible to specify the describing program used for describing the contract content. Further, since the signature of a creator of the describing program is added to the describing program, it is possible to specify the creator of the describing program and, if a conflict on the contract takes place between the concerned parties, verify the describing program. This is effective in preventing the describing program from being incorrectly operated, thereby improving the safety on the contract.

Hereafter, the description will be oriented to the second embodiment of the invention with reference to FIGS. 20 to 31.

Figure 20:
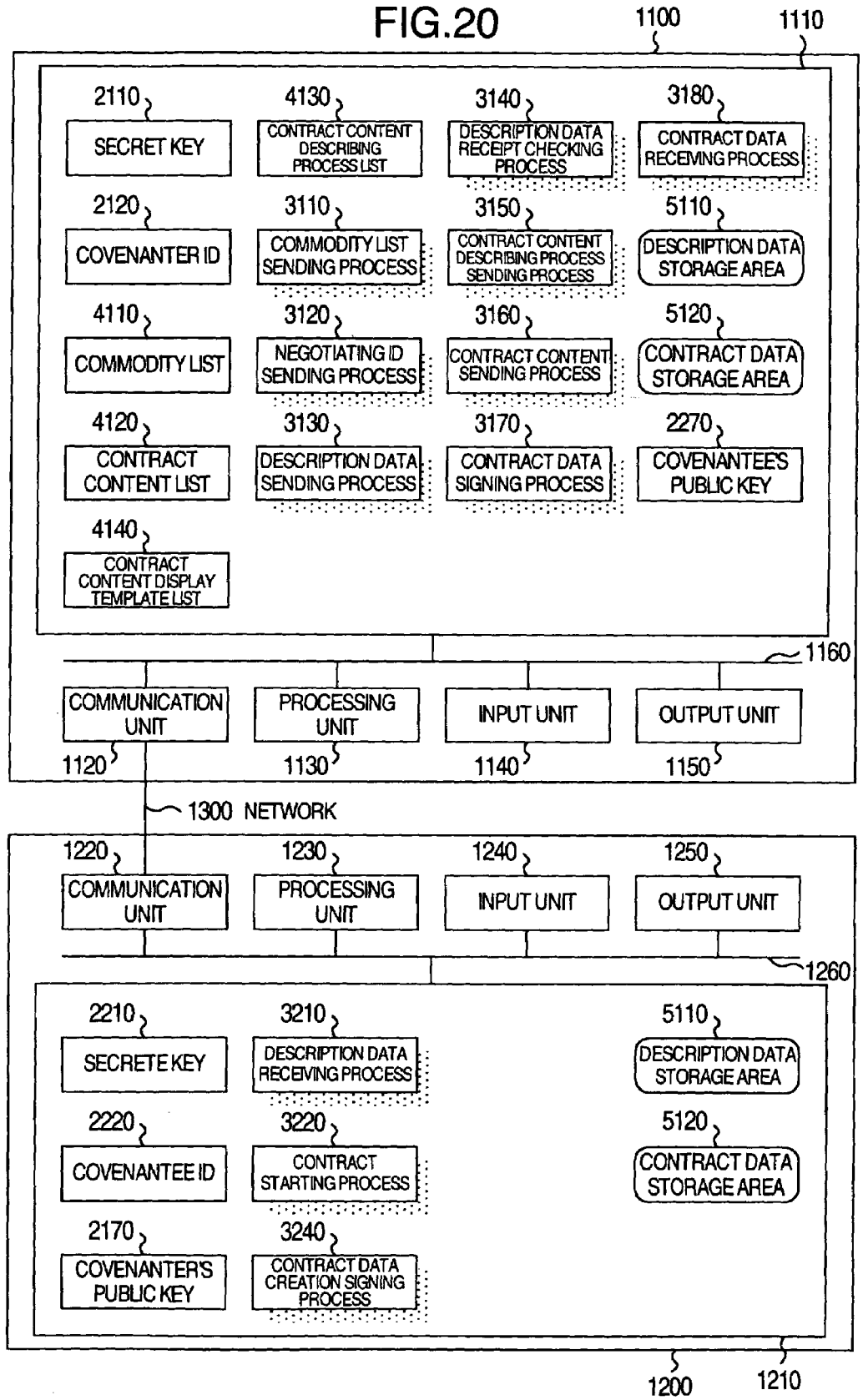
FIG. 20 is a view showing a system arrangement in a second embodiment of the invention.

The system arrangement for realizing the second embodiment is illustrated in FIG. 20. The difference between the system arrangement of the second embodiment and that of the first embodiment is provision of a contract content display template list 4140 in the storage unit 1110 of the covenanter system 1100. The details of the contract content display template list 4140 will be discussed below.

Figure 21:
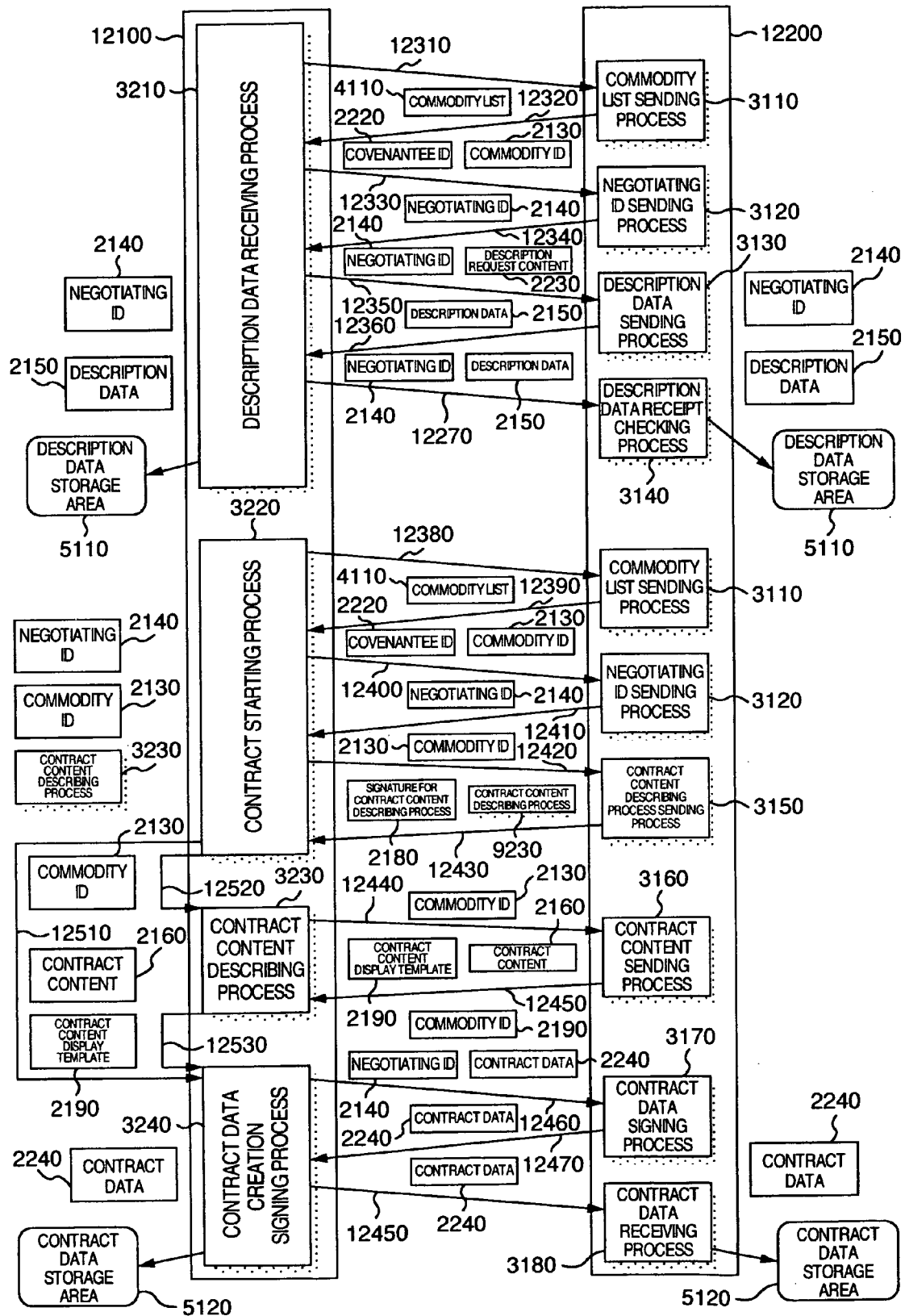
FIG. 21 is a flowchart showing transfer of messages and data between processes in the second embodiment of the invention.

FIG. 21 shows the data to be transferred between the processes to be executed by the covenanter system 1100 and the covenantee system 1200. The difference from the first embodiment shown in FIG. 2 is a reply of not only the contract content 2160 but a contract content display template in the case of the reply from the contract content sending process 3160 to the contract content describing process 3230 (arrow 12450). The details of the contract content display template 2190 will be discussed below. In the case of the reply from the contract content describing process 3230 to the contract data creation signing process 3240 (arrow 12530), not only the contract content 2160 but the contract content display template 2190 are given back to the process 3240.

In the second embodiment, the processes except the contract content describing process 3230, the contract content sending process 3160, the contract data creation signing process 3240 and the contract data signing process 3170 are the same as those of the first embodiment. Hereafter, those four processes will be described in detail.

Figure 22:
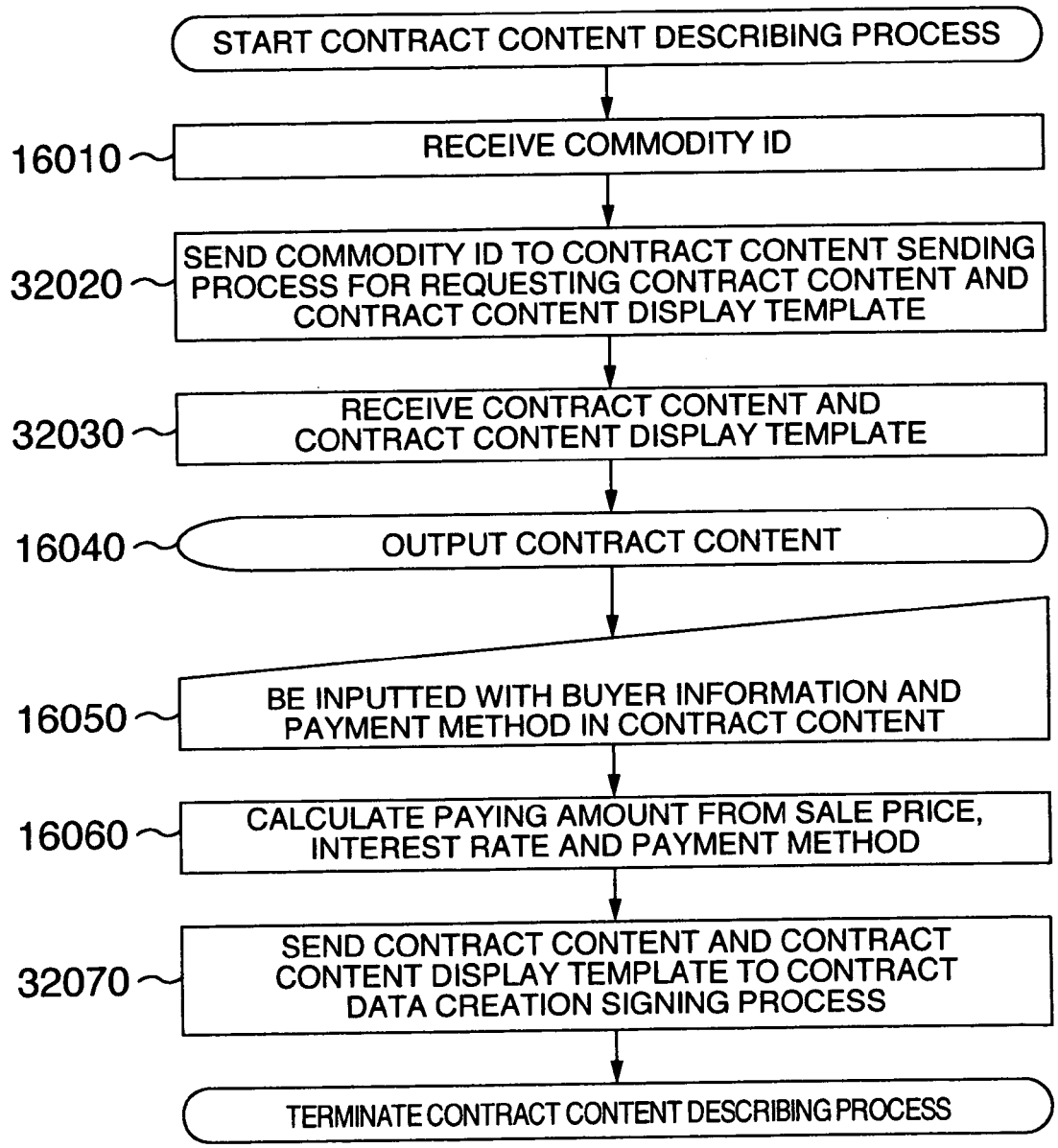
FIG. 22 is a flowchart showing a process of describing a content of a contract in the second embodiment of the invention.

The contract content describing process 3230 will be described with reference to the flowchart of FIG. 22. The difference from the contract content describing process 3230 of the first embodiment shown in FIG. 7 is changes of the processing step 16020 into a processing step 32020, the processing step 16030 into a processing step 32030, and the processing step 16070 into a processing step 32070. The content of the change is that the data sent or received at each processing step includes the contract content display template 2190 in addition to the contract content 2160.

Figure 23:
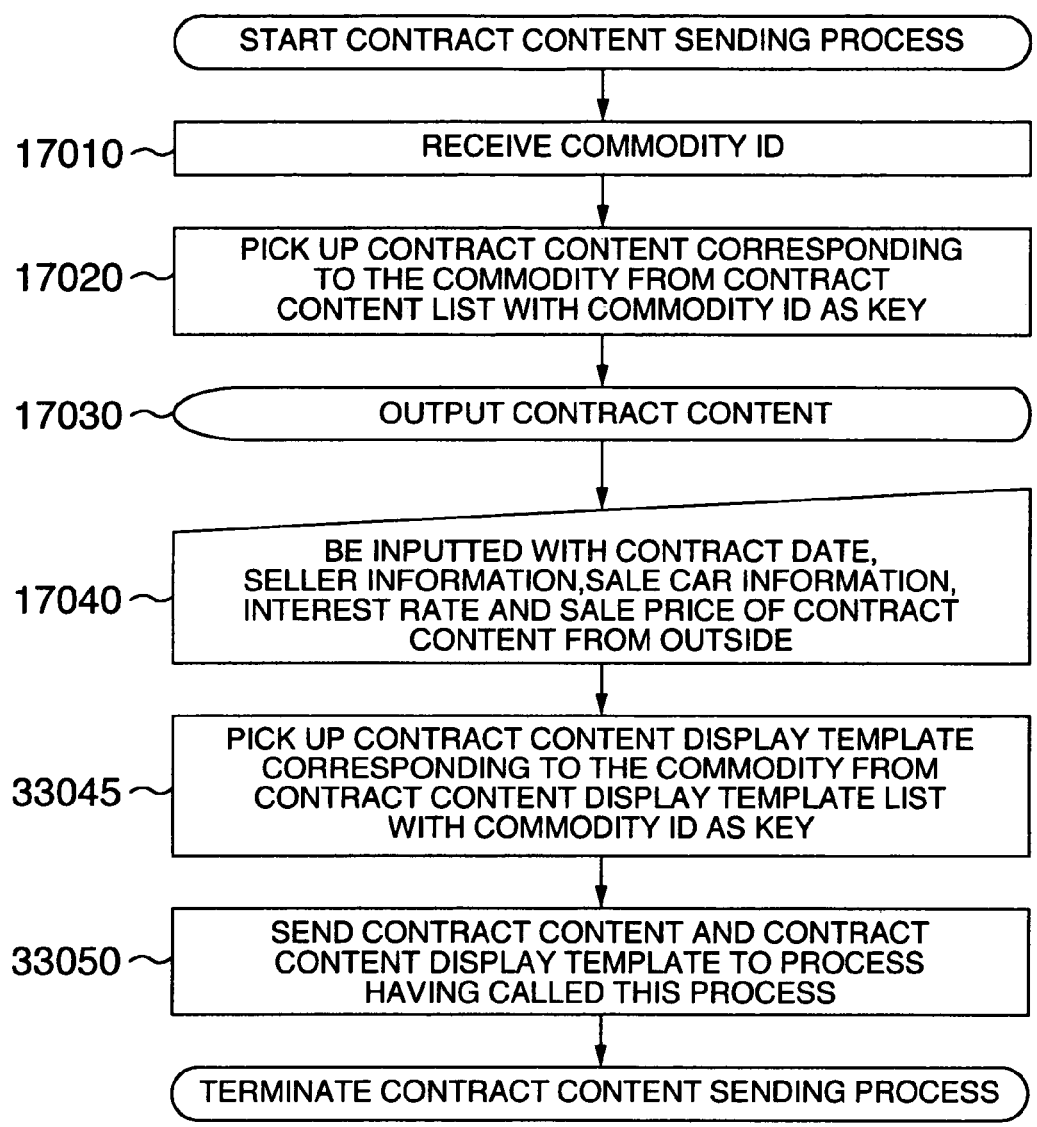
FIG. 23 is a flowchart showing a process of sending a contract content in the second embodiment of the invention.

The contract content sending process 3160 will be described with reference to the flowchart of FIG. 23. The difference from the contract content sending process 3160 of the first embodiment shown in FIG. 8 is a change of the processing step 17050 into a processing step 33050 and an insertion of a processing step 33045 between the processing steps 17040 and 33050. At the step 33045, the operation is executed to retrieve the contract content display template 2190 paired with the commodity ID 2130 matched to the commodity ID 2130 received at the step 17010 from the contract content display template list 4140. As shown in FIG. 28, it is preferable that the contract content display template list is a table for managing a combination of the commodity ID 2130 and the contract content display template 2190. The difference of the processing 33050 from the processing step 17050 is as follows. At the step 17050, the data to be sent is the contract content 2160, while at the step 33050, the contract content 2160 and the contract content display template 2190 are given back.

Figure 24:
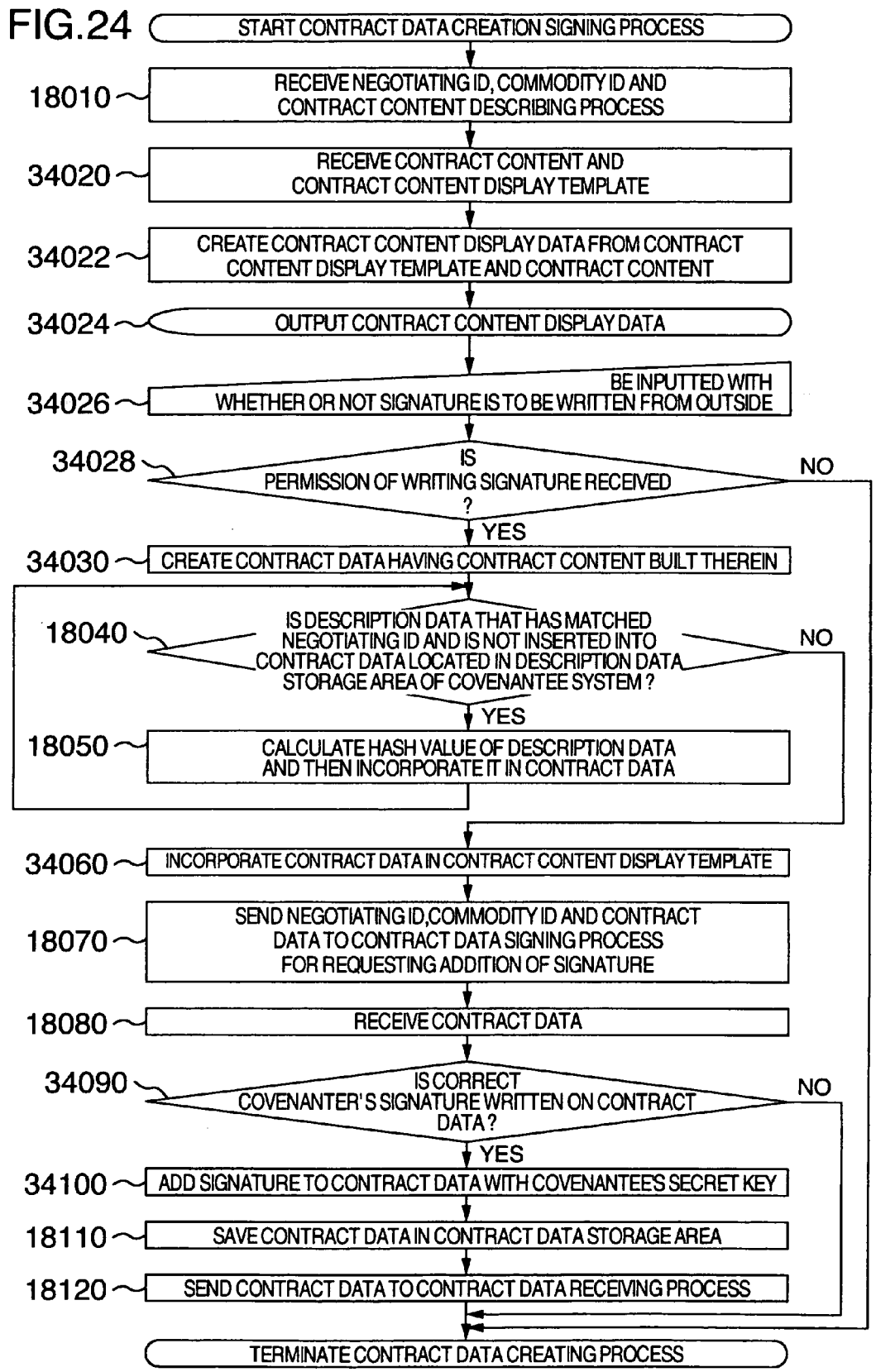
FIG. 24 is a flowchart showing a process of writing a signature for creating the contract data in the second embodiment of the invention.
Figure 26:
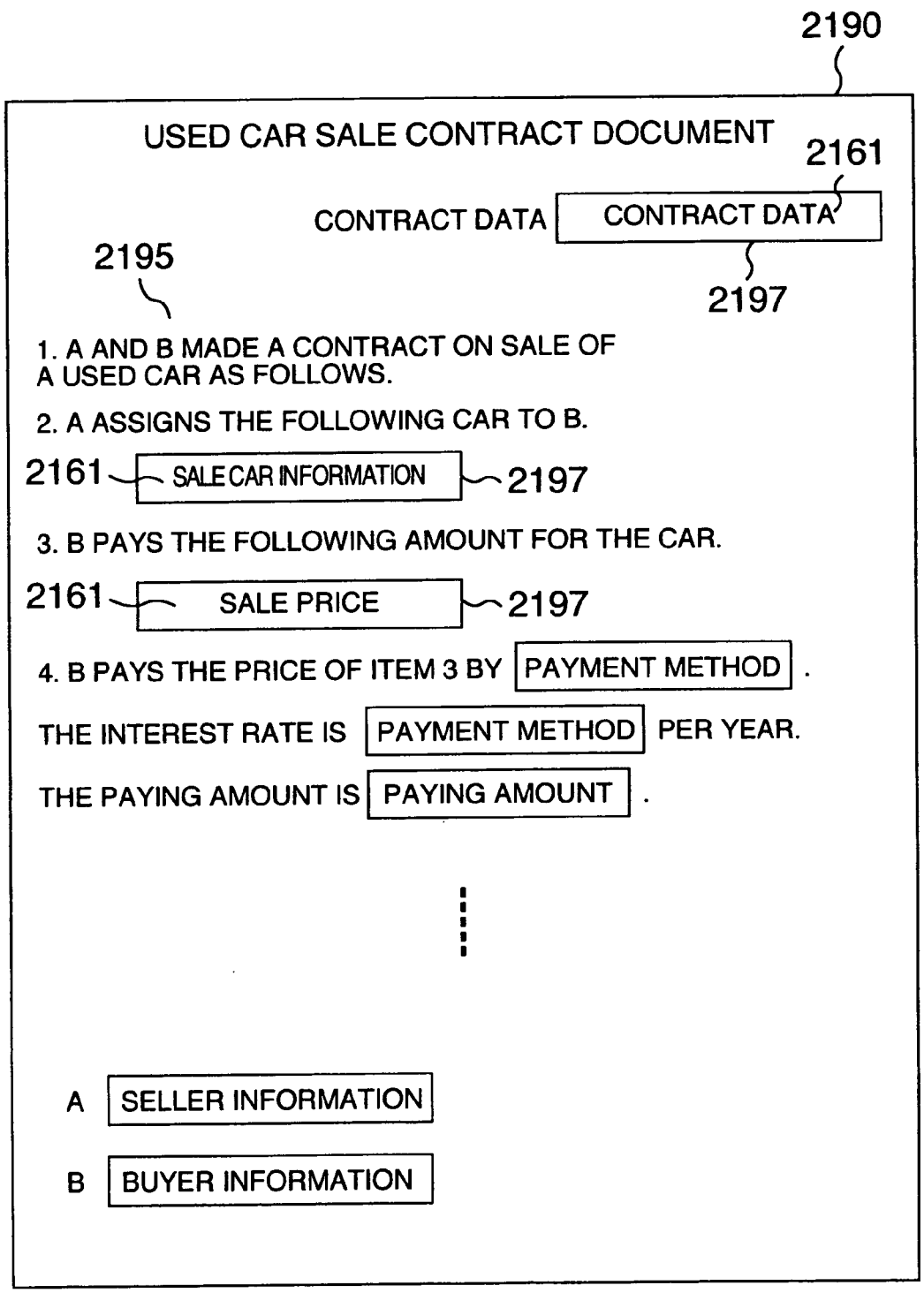
FIG. 26 is a view showing a structure of a template for displaying the content of the contract in the second embodiment of the invention.
Figure 27:
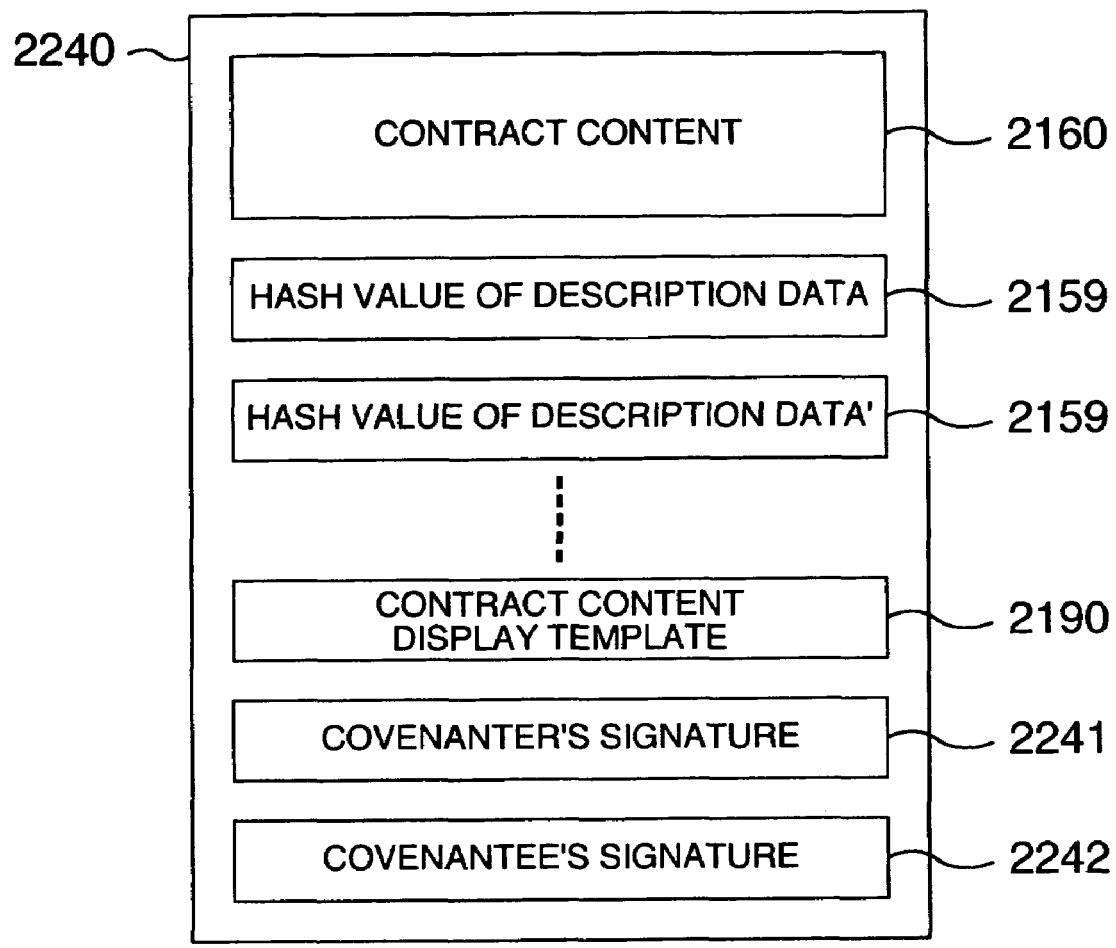
FIG. 27 is a view showing a structure of the contract data in the second embodiment of the invention.

The change point of the contract data creation signing process 3240 will be described with reference to the flowchart of FIG. 24. The difference of the process 3240 from the contract data creation singing process 3240 of the first embodiment is changes of the processing step 18020 into a processing step 34020, the processing step 18030 into a processing step 34030, the processing step 18060 into a processing step 34060, the processing step 18090 into a processing step 34090, and the processing step 18100 into a processing step 34100 and an insertion of processing steps 34022, 34024, 34026, and 34028 between the processing steps 34020 and 34030. The difference of the processing step 34020 from the processing step 18020 is as follows. At the step 18020, the data to be received is the contract content 2160, while at the step 34020, the data to be received is the contract content 2160 and the contract content display template 2190. The contract content display template 2190 is the data (or program) for converting the contract content 2160 into the contract content display data to be outputted by the output unit 1250 of the covenantee system 1200. For example, the contract content display data is composed of a plain text represented by a series of characters. As shown in FIG. 26, the contract content display template 2190 is composed by inserting a blank 2197 in the text data 2195 consisting of a string of characters. The blank 2197 may be singular or plural. Further, an item name 2161 is allocated to the blank 2197. At the processing step 34022, the contract content display data is created from the contract content display template 2190 and the contract content 2160. This creating method is executed to retrieve a value 2163 having the item name 2161 matched to the item name 2161 allocated to the blank 2197 from the contract content 2160 shown in FIG. 17 and then insert the retrieved value 2163 at a position where the blank 2197 inside of the contract content display template 2190 is built. At a processing step 34024, the contract content display data created at the step 34022 is outputted through the use of the output unit 1250 of the covenanter system 1200. At a processing step 24026, the operation is executed to receive an input as to whether or not the signature is given to the contract data 2240 from the covenantee through the use of the input unit 1240 of the covenantee system 1200. At a processing step 24028, if a permission of giving a signature is received at the step 24026, the operation at a processing step 34030 is executed. If the permission is not received, the contract data creation signing process 3240 is terminated. The difference of the processing step 34030 from the processing step 18030 is that at the step 34030 the first-stage contract content display data may be contained in place of the contract content 2160 of the contract data 2240. The difference of a processing step from the processing step 18060 is as follows. At the step 18060, the hash value 2185 of the contract content describing process is inserted into the contract data 2240, while at the step 34060 the contract content display template 2190 is inserted therein. As shown in FIG. 27, therefore, the contract data 2240 includes not the hash value 2185 of the contract content describing process but the contract content display template 2190. The contract data 2240 may contain the hash value of the template 2190 in place of directly building the template 2190 into the contract data 2240. The change at the processing steps 34090 to 34100 is a respect of deleting the hash value 2185 of the contract content describing process from the objects to which the signature is given or to be verified, and adding the contract content display template 2190 to the objects.

Figure 25:
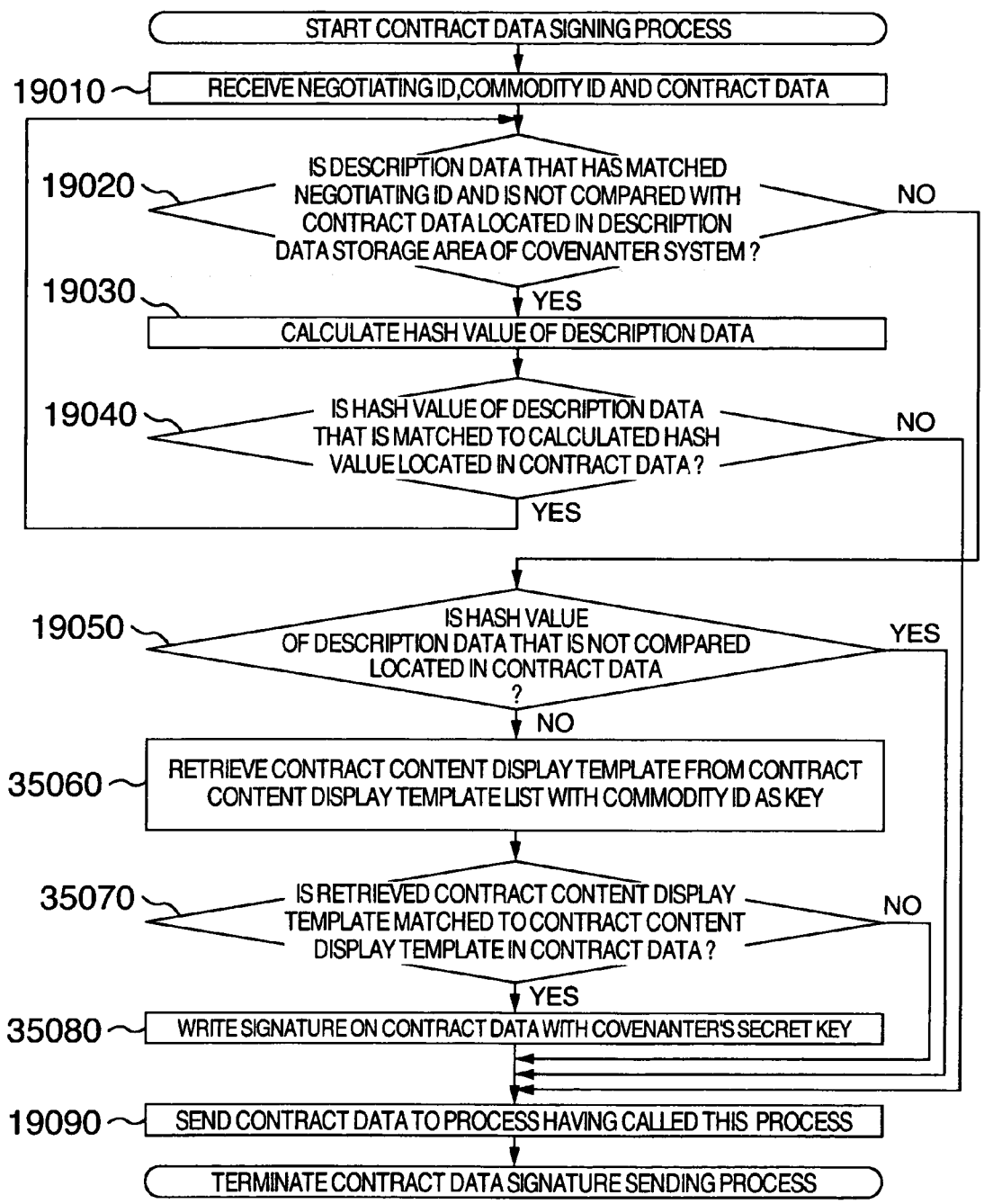
FIG. 25 is a flowchart showing a process of writing a signature on the contract data in the second embodiment of the invention.

The change point of the contract data signing process 3170 will be described with reference to the flowchart of FIG. 25. The difference of this from the contract data signing process of the first embodiment shown in FIG. 10 is changes of the processing step 19060 into a processing step 35060, the processing step 19070 into a processing step 35070, and the processing step 19080 into a processing step 35080. The difference of the processing step 35060 from the processing step 19060 is as follows. At the step 19060, the operation is executed to retrieve the contract content describing process 3230 from the contract content describing process list 4130 and calculating the hash value 2185 of the contract content describing process, while at the step 35060, the operation is executed to retrieve the contract content display template 2190 from the contract content display template list 4140 without calculating the hash value. The difference of the processing step 35070 from the processing step 19070 is as follows. At the step 19070, the comparison is executed for the hash value 2185 of the contract content describing process, while at the step 35070, the comparison is executed for the contract content display template 2190. The difference of the processing step 35080 from the processing step 19080 is as follows. At the step 19080, the objects to which the signature is given includes the hash value 2185 of the contract content describing process, while at the step 35080, the objects include not the hash value 2185 but the contract content display template 2190.

Hereafter, the second embodiment will be summarized. The second embodiment is characterized in that the contract data creation signing process 3240 is executed to output the contract content 2160 to the outside and writing the signature on the contract data 2240 after a permission of writing the signature is received. The contract content display template 2190 used for displaying the contract content 2160 is made to be an object to be signed by the covenanter system 1100 and the covenantee system 1200 as corresponding the template 2190 to the contract data 2240. This makes it possible to prove if the contract content display template 2190 has a problem.

The second embodiment of the invention offers the following effect in addition to the effect the first embodiment involves. That is, the second embodiment makes it possible to specify the contract content display template used for displaying the contract content by managing the contract content and the contract content display template as corresponding one with the other, specify the person who created the contract content display program by giving the signature of the person who created the contract content display program to the contract content display program, and verify the contract content display template if a conflict on the contract takes place between the concerned parties, thereby preventing the contract content display template from being interpolated and improving the safety on the contract.

The technical concept of this invention is not limited to the foregoing first and second embodiments of the invention.

What is claimed is:

1. A recording medium for recording a contract processing program for enabling a contract processing system to execute a contract process for processing a contract for provision of a commodity or service, wherein said contract process comprises:
   a process for electronically creating contract data containing said contract content and a negotiating ID determined between concerned parties on said contract;
   a process for electronically using said negotiating ID as a key, description data corresponding to said contract data from multiple description data containing a description content about said commodity or service having been transferred between the concerned parties about said contract before concluding said contract;
   a process for electronically inserting a data string determined with regard to said retrieved description data in said contract data; and
   a process for appending an electronic signature of at least of said concerned parties to said contract data containing said data string.

2. A recording medium as claimed in claim 1, wherein said process for inserting said data string is executed to insert said retrieved description data in said contract data as said data string.

3. A recording medium as claimed in claim 1, wherein said process for inserting said data string is executed to calculate a hash value of said retrieved description data and to insert the hash value of said description data in said contract data as said data string.

4. A recording medium as claimed in claim 1, wherein said contracting process includes a process for determining whether or not either of the electronic signatures of said concerned parties added to said description data is correct and a process for adding the electronic signature of the other concerned party to said description data if the electronic signature of one of said concerned parties added to said description data is determined to be correct.

5. A recording medium as claimed in claim 1, wherein said contracting process further includes a process for describing said contract content on an electronic contract document on said contract and a process for inserting a data string determined with regard to a describing program for executing said describing process in said contract data.

6. A recording medium as claimed in claim 1, wherein said contracting process further includes a process for inserting a contract content display template for creating from said contract content a contract content display data to be outputted to an output unit in said contract data.

7. A recording medium as claimed in claim 1, wherein said process for appending a signature on said contract data is executed to append said electronic signature on said contract data if a permission for appending said electronic signature to said contract data is received.

8. A method for processing a contract for provision of a commodity or service, comprising the steps of:
   electronically creating contract data containing said contract content and a negotiating ID determined between concerned parties on said contract;
   electronically retrieving, using said negotiating ID as a key, description data corresponding to said contract data form multiple description data containing a description content about said commodity or service having been transferred between the concerned parties about said contract before concluding said contract;
   electronically inserting a data string determined with regard to said retrieved description data in said contract data; and
   electronically appending an electronic signature of at least one of said concerned parties to said contract data containing said data string.

9. A method as claimed in claim 8, wherein said step of inserting said data string inserts said retrieved description data in said contract data as said data string.

10. A method as claims in claim 8, wherein said step of inserting said data string calculates a hash value of said retrieved description data and inserts the hash value of said description data in said contract data as said data string.

11. A method as claimed in claim 8, further comprising the step of determining whether or not either of the electronic signatures of said concerned parties appended to said description data is correct, and wherein said step of appending an electronic signature appends the electronic signature of the other concerned party to said description data if the electronic signature of one of said concerned parties appended to said description data is determined to be correct.

12. A method as claimed in claim 8, further comprising the steps of:

describing said contract content on an electronic contract document on said contract; and inserting a data string determined with regard to a describing program for executing said describing process in said contract data.

13. A method as claimed in claim 8, further comprising the step of inserting a contract content display template for creating from said contract content a contract content display data to be outputted to an output unit in said contract data.

14. A method as claimed in claim 8, wherein said step of appending a signature appends said electronic signature on said contract data if a permission for appending said electronic signature to said contract data is received.

15. A system for processing a contract for provision of a commodity or service, comprising:

a module for creating contract data containing said contract content and a negotiating ID determined between concerned parties on said contract;

a module for retrieving, using said negotiating ID as a key, description data corresponding to said contract data from multiple description data containing a description content about said commodity or service having been transferred between the concerned parties about said contract before concluding said contract;

a module for inserting a data string determined with regard to said retrieved description data in said contract data; and a module for appending an electronic signature of at least one of said concerned parties to said contract data containing said data string.

16. A system as claimed in claim 15, wherein said module for inserting said data string inserts said retrieved description data in said contract data as said data string.

17. A system as claimed in claim 15, wherein said module for inserting said data string calculates a hash value of said retrieved description data and inserts the hash value of said description data in said contract data as said data string.

18. A system as claimed in claim 15, further comprising:

a module for determining whether or not either of the electronic signatures of said concerned parties added to said description data is correct; and a module for appending the electronic signature of the other concerned party to said description data if the electronic signature of one of said concerned parties appended to said description data is determined to be correct.

19. A system as claimed in claim 15, further comprising:

a module for describing said contract content on an electronic contract document on said contract; and a module for inserting a data string determined with regard to a describing program for executing said describing process in said contract data.

20. A system as claimed in claim 15, further comprising a module for inserting a contract content display template for creating from said contract content a contract content display data to be outputted to an output unit in said contract data.

21. A system as claimed in claim 15, wherein said module for appending a signature on said contract data appends said electronic signature on said contract data if a permission for appending said electronic signature to said contract data is received.

* * * * *